US006769550B2

(12) United States Patent
Adams et al.

(10) Patent No.: US 6,769,550 B2
(45) Date of Patent: Aug. 3, 2004

(54) SCREEN ASSEMBLIES FOR SHALE SHAKERS

(75) Inventors: Thomas C. Adams, Hockley, TX (US); Haynes Smith, Kingwood, TX (US); James Adams, Conroe, TX (US); Charles N. Grichar, Houston, TX (US); Kerry Ward, Cypress, TX (US); George Alexander Burnett, Aberdeen (GB); Kenneth W. Seyffert, Houston, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 156 days.

(21) Appl. No.: 10/057,755

(22) Filed: Jan. 23, 2002

(65) Prior Publication Data
US 2003/0136710 A1 Jul. 24, 2003

Related U.S. Application Data

(63) Continuation-in-part of application No. 10/050,690, filed on Jan. 16, 2002, and a continuation-in-part of application No. 10/053,350, filed on Jan. 16, 2002, now Pat. No. 6,662,952.

(51) Int. Cl.[7] ............................................... B07B 1/49
(52) U.S. Cl. ...................................... 209/399; 209/403
(58) Field of Search ................................ 209/325, 392, 209/393, 396, 397, 399, 403, 406

(56) References Cited

U.S. PATENT DOCUMENTS

| | | | |
|---|---|---|---|
| 912,481 A | 2/1909 | Melish | 209/408 |
| 2,777,579 A | 1/1957 | Roubal | 209/412 |
| 2,895,303 A | 5/1959 | Wright | 209/405 |
| 2,985,303 A | 5/1961 | Wright | |
| 3,390,771 A | 7/1968 | Wehner | 209/365 |
| 3,900,628 A | 8/1975 | Stewart | 428/134 |

(List continued on next page.)

FOREIGN PATENT DOCUMENTS

| | | | |
|---|---|---|---|
| DE | 2836326 | 9/1979 | |
| DE | 33 01 493 A1 | 1/1983 | ............. B07B/1/46 |
| EP | 0 710 509 A1 | 5/1994 | |

(List continued on next page.)

*Primary Examiner*—Donald P. Walsh
*Assistant Examiner*—Kaitlin Joerger
(74) *Attorney, Agent, or Firm*—Guy McClung

(57) ABSTRACT

A shale shaker system for separating components of drilling fluid with solids entrained therein, the shale shaker system, in at least certain aspects, including a base, a screen mounting basket on the base, vibrating apparatus connected to the screen mounting basket for vibrating the screen mounting basket, the screen mounting basket having mounting structure for at least one screen assembly mounted on the mounting structure, the mounting structure having a body over which the at least one screen assembly is positionable, some components of the drilling fluid to be treated by the shale shaker flowable through the at least one screen assembly and through the body, at least one wear strip attached to the mounting structure, the at least one wear strip having a wear strip body, at least one upwardly projecting member projecting upwardly from the wear strip body, the at least one screen assembly including a screen support with screening material and at least one hole in the support sized, configured, and located for receiving the at least one upwardly projecting member of the wear strip body of the mounting structure and the at least one upwardly projecting member sized, located and configured for receipt within the at least one hole.

15 Claims, 20 Drawing Sheets

U.S. PATENT DOCUMENTS

| | | | | |
|---|---|---|---|---|
| 4,224,146 | A | 9/1980 | Kent et al. | 209/243 |
| 4,575,421 | A | 3/1986 | Derrick et al. | 209/397 |
| 5,032,210 | A | 7/1991 | Hukki et al. | 156/359 |
| 5,051,171 | A | 9/1991 | Hukki | 209/323 |
| 5,112,475 | A | 5/1992 | Henry, Jr. | 209/399 |
| 5,139,154 | A | 8/1992 | Gero et al. | 209/273 |
| 5,372,261 | A * | 12/1994 | Galton et al. | 209/399 |
| 5,417,793 | A | 5/1995 | Bakula | 156/308.2 |
| 5,690,826 | A | 11/1997 | Cravello | 210/384 |
| 5,720,881 | A | 2/1998 | Derrick et al. | 210/388 |
| 5,783,077 | A | 7/1998 | Bakula | 210/388 |
| 5,816,413 | A * | 10/1998 | Boccabella et al. | 209/399 |
| 5,819,951 | A | 10/1998 | Sultanovich et al. | 209/313 |
| 5,944,993 | A | 8/1999 | Derrick et al. | 210/388 |
| 5,967,336 | A | 10/1999 | Baltzer et al. | 209/403 |
| 6,000,556 | A | 12/1999 | Bakula | 210/388 |
| 6,032,806 | A | 3/2000 | Leone et al. | 209/402 |
| 6,220,448 | B1 | 4/2001 | Bakula et al. | 209/392 |
| 6,269,954 | B1 | 8/2001 | Baltzer | 209/405 |
| 6,290,068 | B1 | 9/2001 | Adams et al. | 209/401 |
| 6,401,934 | B1 | 6/2002 | Largent et al. | 209/401 |

FOREIGN PATENT DOCUMENTS

| | | | | |
|---|---|---|---|---|
| EP | 1205261 | A2 | 2/1998 | |
| GB | 457924 | | 12/1936 | |
| GB | 743902 | | 4/1952 | |
| GB | 1561802 | | 7/1976 | |
| GB | 2113121 | A | 1/1982 | B07B/1/46 |
| GB | 2252127 | A | 1/1991 | F16B/2/08 |
| SU | 1 505 601 | A | 9/1987 | |
| SU | 1 433 509 | A | 10/1988 | |
| SU | 1433509 | | 10/1988 | |
| SU | 1505601 | | 9/1989 | |
| WO | WO 90/05594 | | 5/1990 | |
| WO | WO 92/00133 | | 1/1992 | |
| WO | WO 01/76719 | A2 | 4/2000 | B01D/33/00 |

* cited by examiner

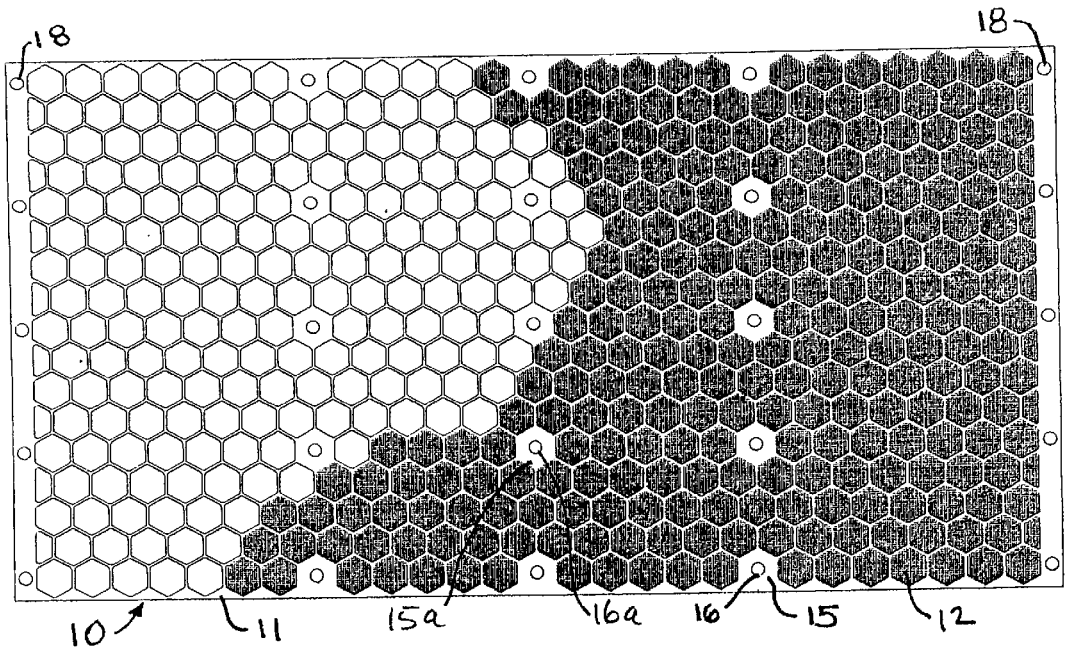
Fig. 1A
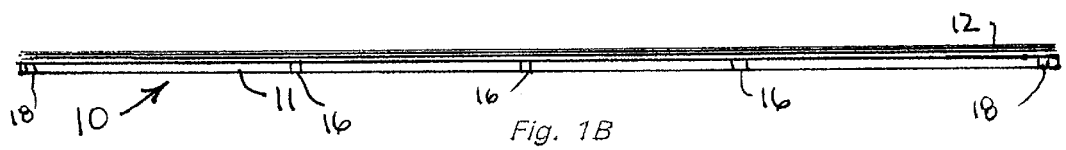
Fig. 1B
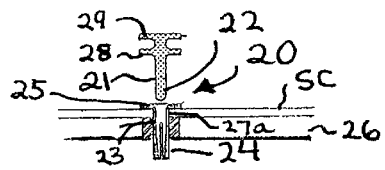
Fig. 2A
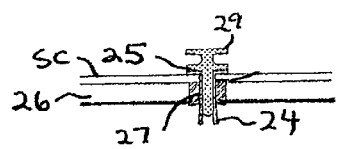
Fig. 2B
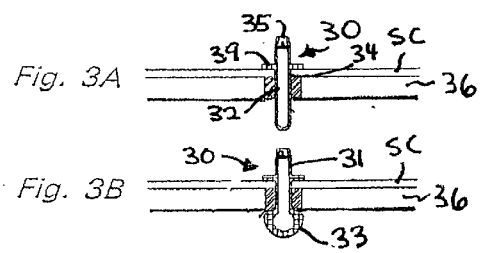
Fig. 3A
Fig. 3B
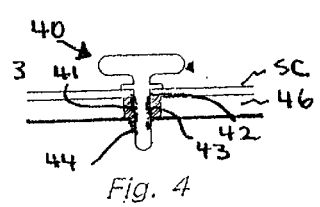
Fig. 4

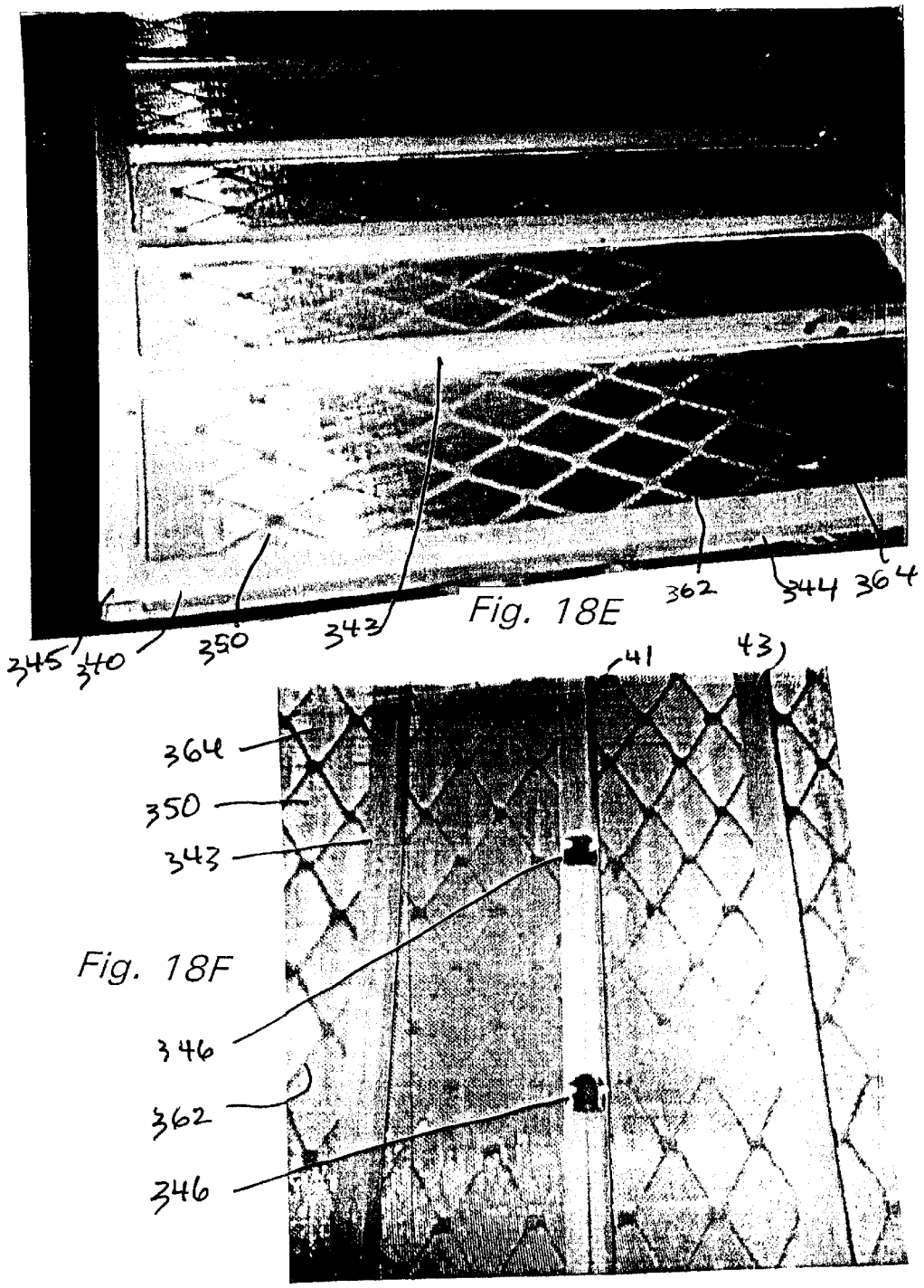

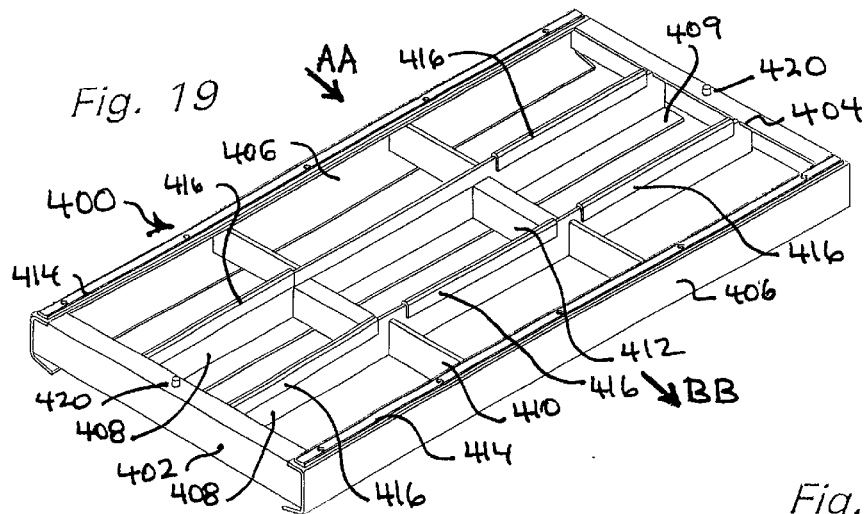
Fig. 19
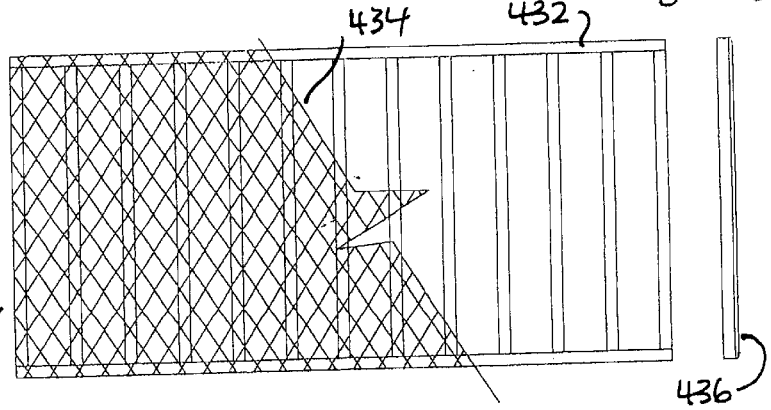
Fig. 20A
Fig. 20B
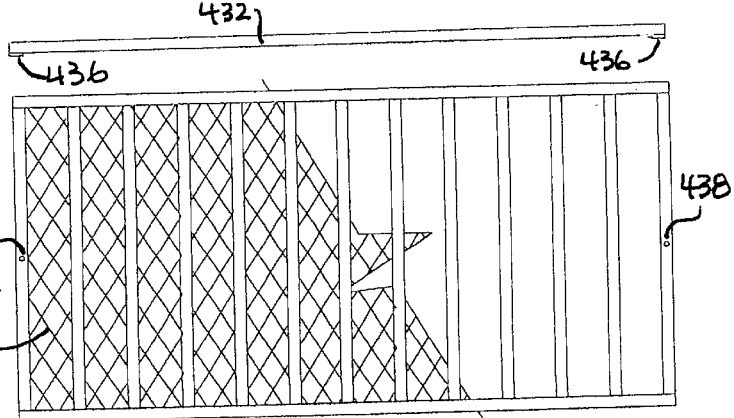
Fig. 20C
Fig. 20D
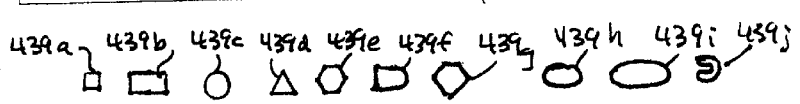
Fig. 20E

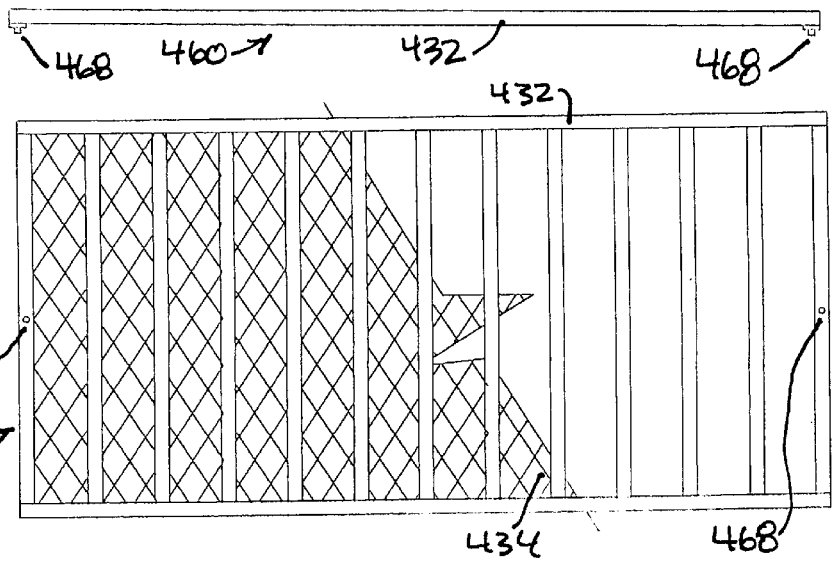
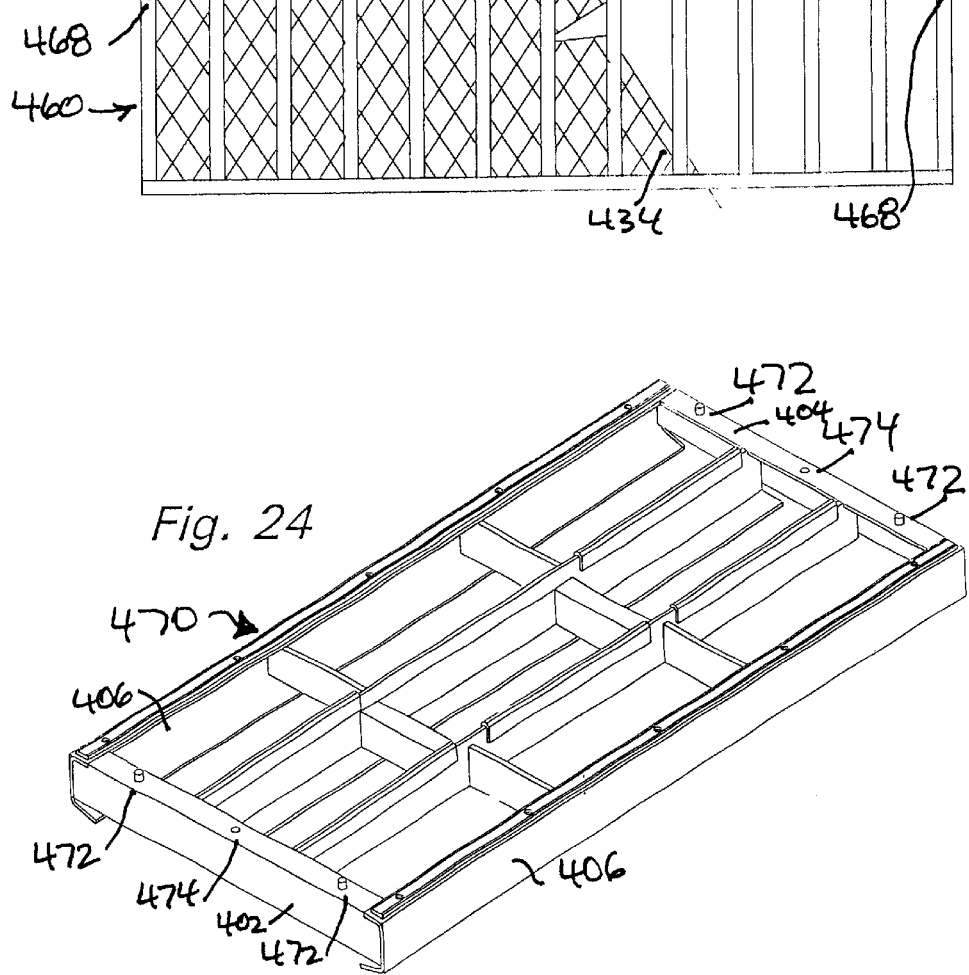

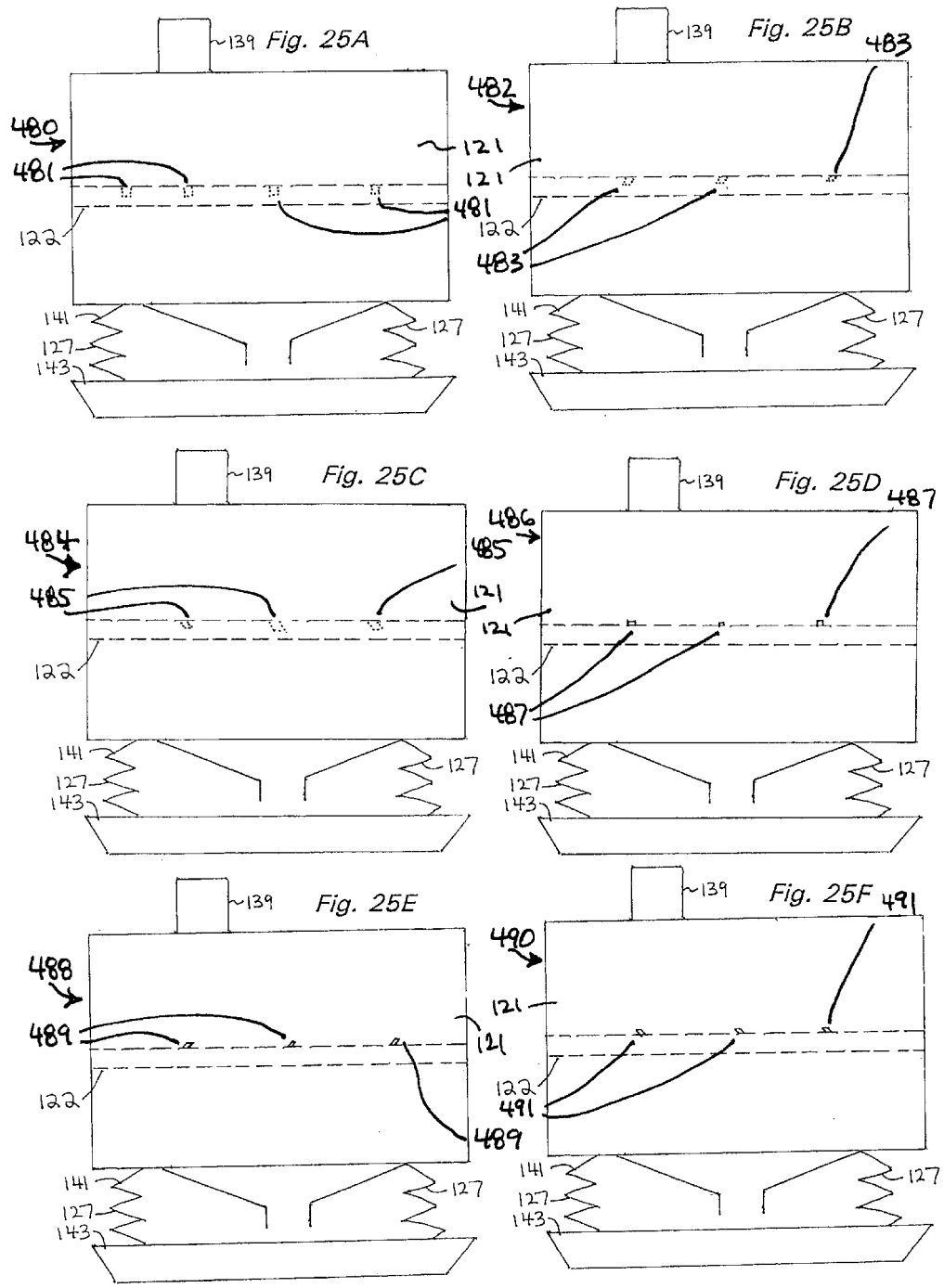

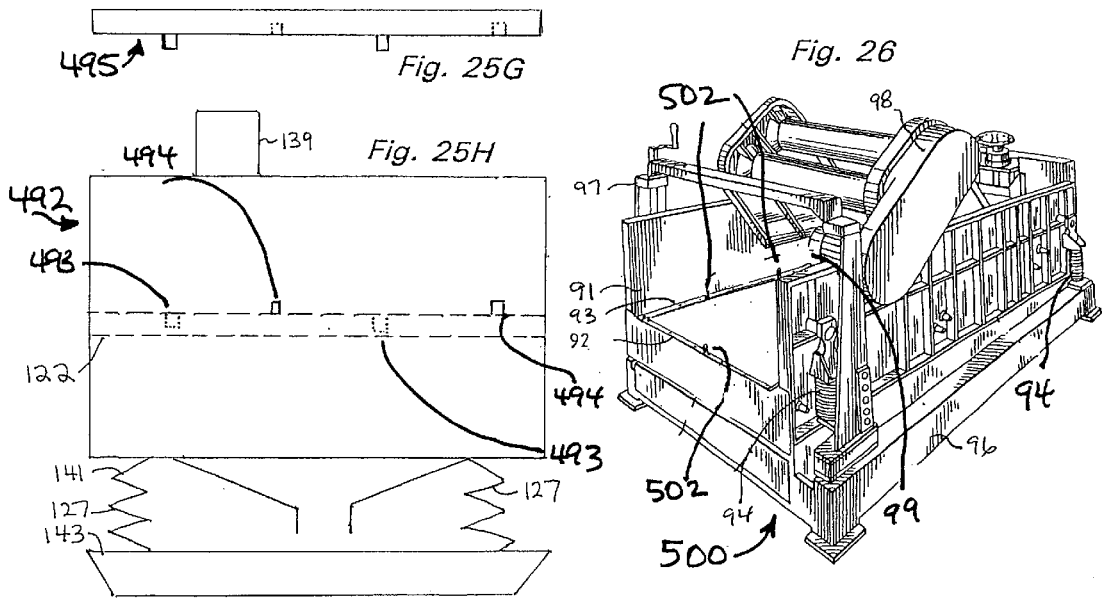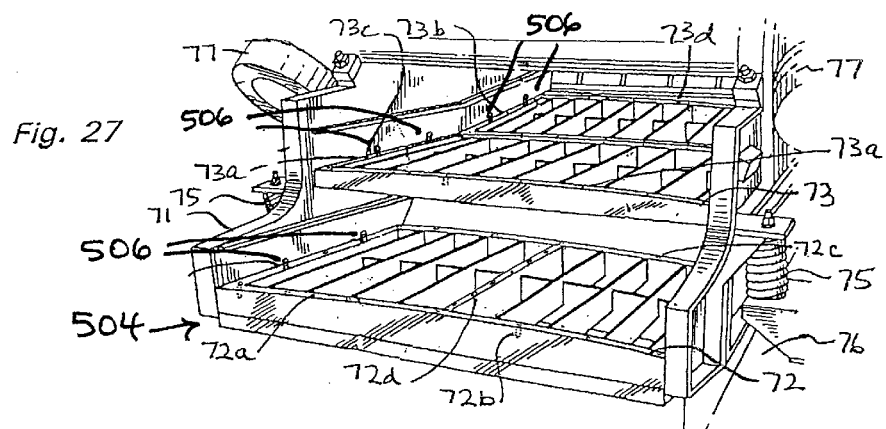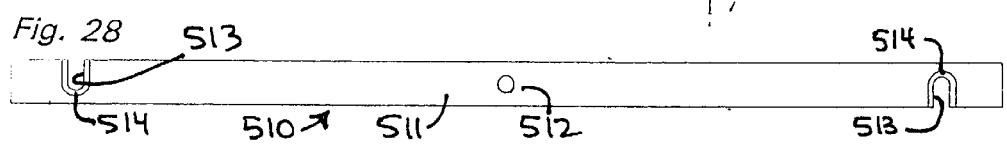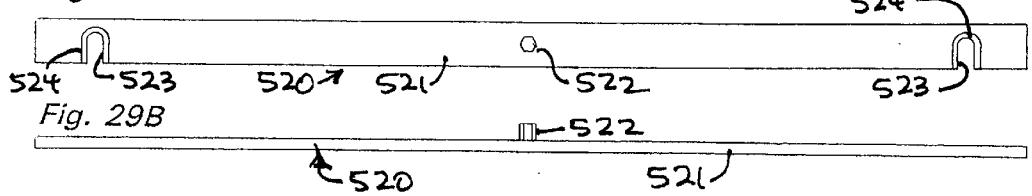

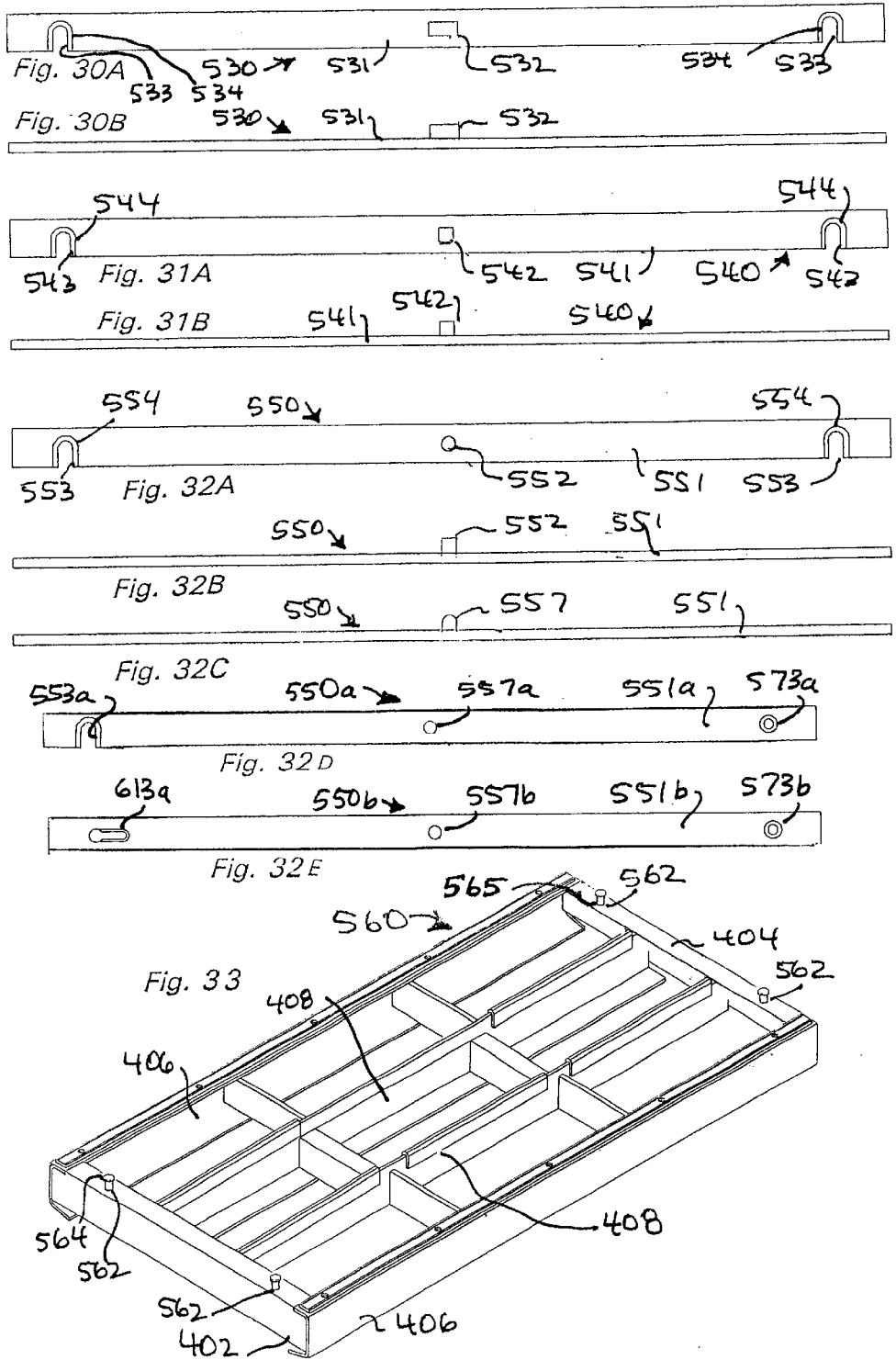

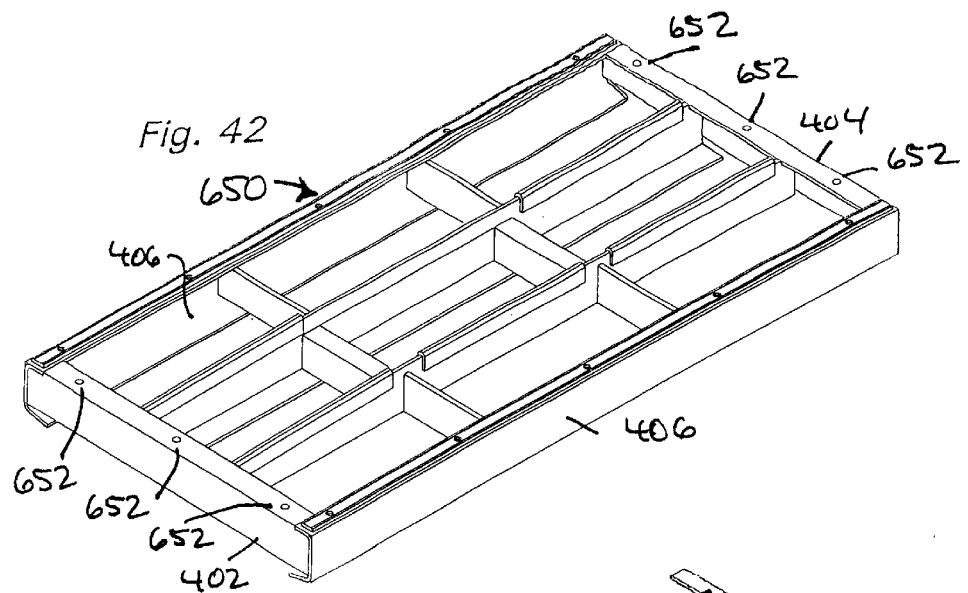
Fig. 42
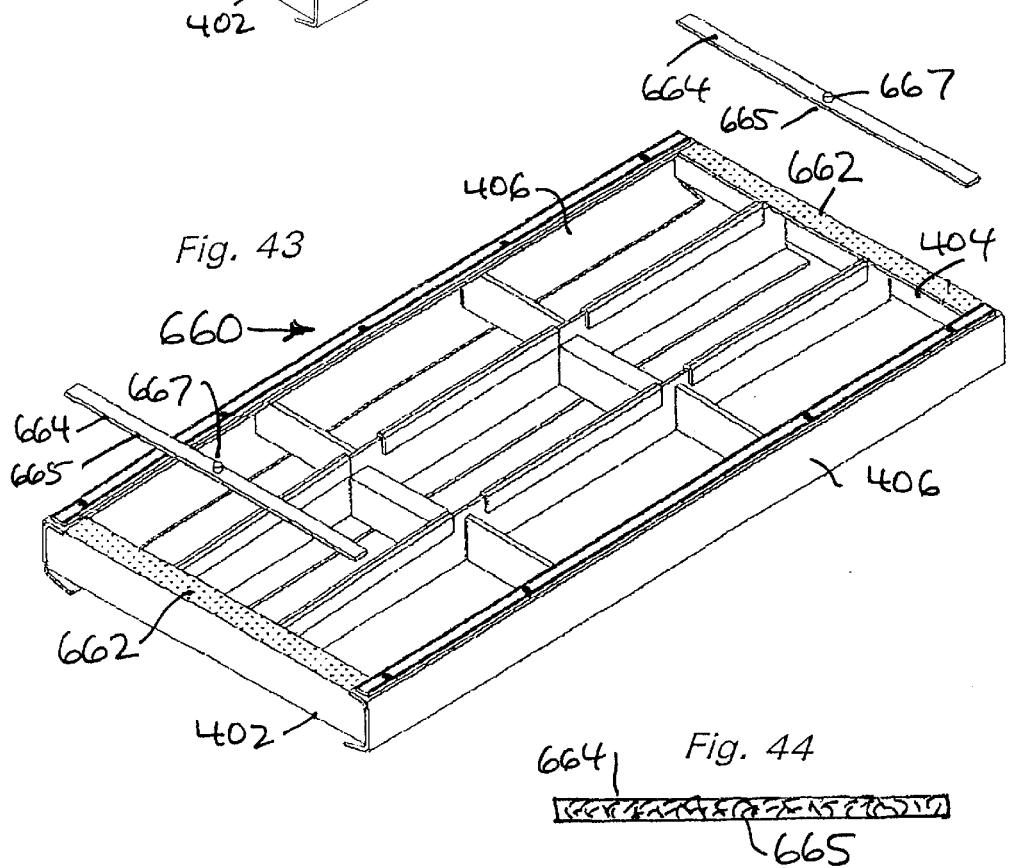
Fig. 43
Fig. 44

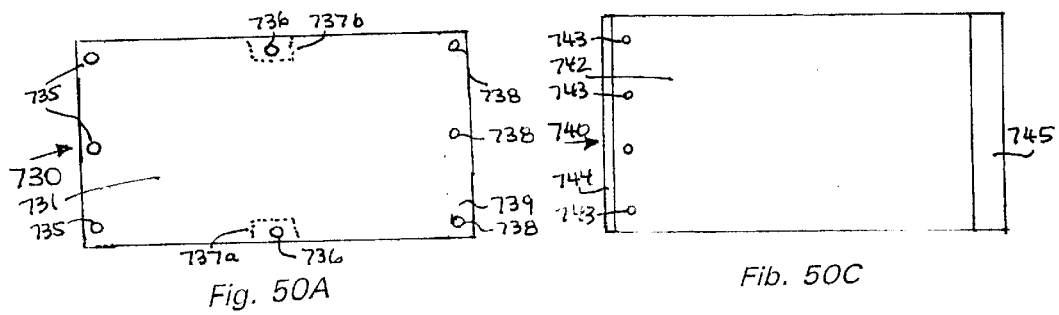
Fig. 50A  Fib. 50C
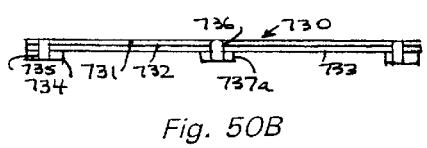
Fig. 50B
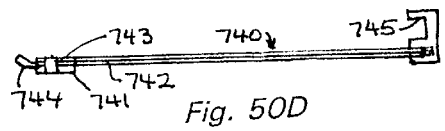
Fig. 50D
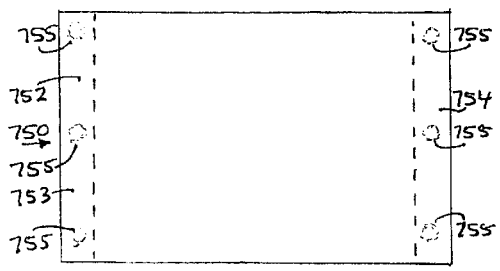
Fig. 50E
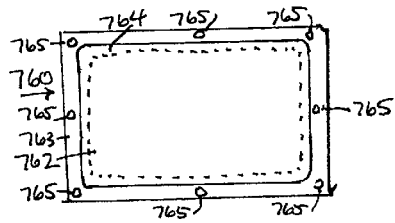
Fig. 50G
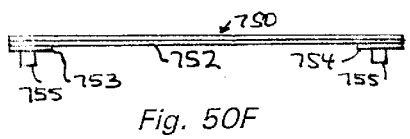
Fig. 50F
Fig. 51

SCREEN ASSEMBLIES FOR SHALE SHAKERS

RELATED APPLICATIONS

This is a continuation-in-part of pending U.S. patent application: Ser. No. 10/050,690 filed on Jan. 16, 2002 entitled "Self-Flattening Screens For Vibratory Separators" naming as co-inventors Thomas C. Adams, Kerry Ward, Kenneth W. Seyffert, David W. Largent, David L. Schulte, Jr., Charles N. Grichar, Vincent D. Leone, Jeffrey E. Walker, and Guy L. McClung III; and Ser. No. 10/053,350 filed on Jan. 16, 2002 now U.S. Pat. No. 6,662,952, entitled "Shale Shakers and Screens For Them" naming as co-inventors Thomas C. Adams and Guy L. McClung, III—both applications incorporated fully herein in their entirety for all purposes and with respect to which and from which the present invention claims priority under the Patent Laws.

BACKGROUND OF THE INVENTION

1. Field of the Invention

The present invention is directed to screen assemblies for shale shakers, mounting structure for such screen assemblies, shale shakers with such screen assemblies, and methods of using such mounting structures, screen assemblies and shakers.

2. Description of Related Art

Vibratory separators are used in a wide variety of industries to separate materials such as liquids from solids or solids from solids. Typically such separators have a basket or other screen holding or mounting apparatus mounted in or over a receiving receptacle or tank and vibrating apparatus for vibrating the basket. One or more screens is mounted in the basket. Material to be treated is introduced to the screen(s) either by flowing it directly onto the screen(s) or by flowing it into a container, tank, or "possum belly" from which it then flows to the screen(s). Also in some multi-screen apparatuses material flows from an upper screen onto a lower screen.

The prior art discloses a variety of mounting systems and apparatuses for releasably mounting a screen assembly to a shale shaker. These include drawbar and hookstrip apparatuses; inflatable device systems; wedge systems; e.g. the systems described in U.S. Pat. No. 6,179,128 issued Jan. 30, 2001; U.S. Pat. No. 5,392,925 issued Feb. 28, 1995; U.S. Pat. No. 4,882,054 issued Nov. 21, 1989; U.S. Pat. No. 4,582,597 issued Apr. 15, 1986; and in the prior art referred to in each of these references.

Referring now to FIG. 5, a prior art shale shaker 1 has a screen 2 (with screen or screening cloth or mesh as desired) mounted on vibratable screen mounting apparatus or "basket" 3. The screen 2 may be any known screen or screens. The basket 3 is mounted on springs 4 (only two shown; two as shown are on the opposite side) which are supported from a frame 6. The basket 3 is vibrated by a motor 5 and interconnected vibrating apparatus 8 which is mounted on the basket 3 for vibrating the basket and the screens. Elevator apparatus 7 provides for raising and lowering of the basket end.

FIG. 6 discloses an example of a prior art shaker system (e.g. as shown in U.S. Pat. No. 5,190,645 incorporated fully herein for all purposes). The system A has a shale shaker K having a screen or screens S. The screen(s) S are mounted in a typical shaker basket B and one or more vibrators V (any known suitable shaker vibrator) vibrate the basket B and hence the screen(s) S. The other components of the system A are as described in U.S. Pat. No. 5,190,645.

There is a need, recognized by the present inventors, for an efficient and effective screen mounting structure and method for screen assemblies for shale shakers. There is a need, recognized by the present inventors, for an efficient and stable mounting of screens to a shale shaker.

SUMMARY OF THE PRESENT INVENTION

The present invention discloses, in at least certain aspects, a screen assembly for a shale shaker, the screening assembly with one, two, three, four or more pins, studs, or fingers projecting downwardly from a lower support, the pins, studs, members, or fingers ("projecting members") for insertion into a corresponding holes in a shale shaker screen assembly mounting tray, bed, or deck. Such pin(s), stud(s), and/or finger(s) provide for correct emplacement and positioning of the screen assembly (or assemblies) on the shale shaker tray, bed, or deck and also stabilize the screen assembly or assemblies during operation of the shale shaker. The downwardly projecting member(s) may be formed integrally of a screen support (frame, strip support, perforated plate, unibody structure) and/or they may be releasably attached to or connected to the support.

A shale shaker, in one embodiment according to the present invention (e.g. with basic components as the prior art shakers described or referred to herein) is, according to the present invention, provided with one or more screen assemblies with such projecting members as described herein according to the present invention. Such a shaker has a hole or holes in its screen-mounting tray, bed or deck corresponding to the pin(s) and/or finger(s) of the screen assembly (or assemblies) mounted thereon.

A screen assembly according to the present invention may be any known shale shaker screen or screen assembly to which the pin(s), stud(s), and/or finger(s) are added.

The present invention, in one embodiment includes a shale shaker with a frame; a "basket" or screen mounting apparatus in the frame with a bed, tray or deck for a screen assembly or screen assemblies therein; pin(s) and/or finger(s) projecting up from the bed, tray or deck; one or more screen assemblies according to the present invention with a hole (or holes) corresponding to the pin(s) and/or finger(s) of the deck, bed or tray; the one or more screen assemblies mounted to the basket with the pin (s0 and/or finger(s) projecting into the corresponding hole or holes of the screen assembly or screen assemblies according to the present invention; basket vibrating apparatus; and a collection tank or receptacle below the basket. In one particular aspect such a shale shaker treats drilling fluid with drilled cuttings, debris, etc. entrained therein. With such a shale shaker, the pin(s) and/or finger(s) of the deck, bed or tray can be formed integrally of the deck, bed or tray; or the pin(s) and/or finger(s) may be part of strips, bars, wear strips or elongated members that are releasably connectable to the deck, bed or tray. In one particular aspect, such pin (s0 and/or finger(s) are on separate wear strips that are releasably connected to a shaker tray and which, in position thereon, provide an upward force that forces a screen assembly thereabove upwardly, facilitating the maintenance in position of the screen assembly. Wear strips that are made in an originally upwardly bowed configuration can provide such an upward force or an initially flat wear strip that is installed so that it bows slightly upwardly can provide such a force.

In other aspects of the present invention a hole or holes is or are provided in the upper surface of a support of a screen assembly (or in the lower surface of the support), e.g., but not limited to in part of a tubular frame of a screen assembly and a projecting member or members are moved into such hole or holes (e.g., a downwardly projecting member on a screen assembly holding member or structure or on an air bladder that is inflated above a screen assembly to secure it in place on a shaker deck, bed or tray or an upwardly projecting member on a screen assembly holding member or structure or on an air bladder that is inflated below a screen assembly to secure it in place on a shaker deck, bed or tray). In certain such aspects the screen assemblies shown in the drawings and described in detail below have the hole or holes in the topmost surface of a screen frame or tubular support rather than in the bottom thereof.

It is, therefore, an object of at least certain preferred embodiments of the present invention to provide:

New, useful, unique, efficient, non-obvious screen assemblies for shale shakers and methods for using them to separate components of material to be treated thereby;

Such screen assemblies, and shale shakers therewith, with one or more downwardly projecting members (e.g., studs, positioning pins or fingers) for releasably positioning and mounting such a screen assembly on a shale shaker mounting structure (bed, tray deck); and New, useful, unique, efficient, non-obvious shale shakers with one or more upwardly projecting members on the shaker's deck, bed or tray for insertion into corresponding hole(s) on a screen assembly support of a screen assembly to be mounted on the shaker.

New, useful, unique, efficient, non-obvious screen assemblies with a plurality of glued-together layers (e.g., one two, three or more) of screening material with at least one hole through the layers and through a plate on one side of the combination of layers of screening material, and, in one aspect, such a plate on both sides of the combination of glued-together layers of screening material; and in one aspect such a combination of glued-together layers of screening material with a hook apparatus on one side or end thereof for selective tensioning in a shale shaker; and in one aspect such a screen assembly with one or more projecting members projecting from a plate on the top of or from a plate on the bottom of the screen assembly;

New, useful, unique, efficient, non-obvious wear strips for for screen assembly mounting structures of shale shakers and methods for using them.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1A is a top view of a screen assembly according to the present invention with a screen support according to the present invention.

FIG. 1B is a side view of the screen assembly of FIG. 1A.

FIGS. 2A and 3A are side views in cross-section of fasteners system for use in releasably connecting a screen assembly according to the present invention to a shale shaker.

FIG. 2B shows the fastener of FIG. 2A in position connecting a screen assembly to a shale shaker.

FIG. 3B shows the fastener of FIG. 3A in position following activation connecting a screen assembly to a shale shaker.

FIG. 4 is a side view in cross-section of a fastener system releasably connecting a screen assembly according to the present invention to a shale shaker.

FIG. 18E is a partial bottom perspective view of the screen assembly of 18A. FIG. 18F is a partial bottom view of the screen assembly of FIG. 18A.

FIG. 19 is a perspective view of a screen assembly mounting structure for a shale shaker according to the present invention.

FIG. 20A is a top view of a screen assembly according to the present invention. FIG. 20B is an end view, FIG. 20C is a side view and FIG. 20D is a bottom view of the screen assembly of FIG. 20A. FIG. 20E is a top view of possible hole shapes according to the present invention for the screen assembly of FIG. 20A.

FIG. 23C is a side view and FIG. 23D is a bottom view of the screen assembly of FIG. 23A.

FIG. 24 is a perspective view of a screen assembly mounting structure for a shale shaker according to the present invention.

FIGS. 25A–F and 25H are side schematic views of shale shakers according to the present invention. FIG. 25G is a side view of a screen assembly for the shale shaker of FIG. 25H.

FIG. 26 is a perspective view of a shale shaker according to the present invention.

FIG. 27 is a perspective view of a shale shaker according to the present invention.

FIG. 28 is a top view of a wear strip according to the present invention.

FIG. 29A is a top view of a wear strip according to the present invention. FIG. 29B is a side view of the wear strip of FIG. 29A.

FIG. 30A is a top view of a wear strip according to the present invention. FIG. 30B is a side view of the wear strip of FIG. 30A.

FIG. 31A is a top view of a wear strip according to the present invention. FIG. 31B is a side view of the wear strip of FIG. 31A.

FIG. 32A is a top view of a wear strip according to the present invention. FIG. 32B is a side view of the wear strip of FIG. 32A. FIG. 32C is a side view of an alternative embodiment of the wear strip of FIG. 32A. FIGS. 32D and 32E are top views of wear strips according to the present invention.

FIG. 33 is a perspective view of a screen assembly mounting structure for a shale shaker according to the present invention.

FIG. 42 is a perspective view of a screen assembly mounting structure for a shale shaker according to the present invention.

FIG. 43 is a perspective view of a screen assembly mounting structure for a shale shaker according to the present invention.

FIG. 44 is a bottom view of a wear strip of FIG. 43.

FIG. 50A is a top view of a screen assembly according to the present invention. FIG. 50B is a side cross-section view of the screen assembly of FIG. 50A.

FIG. 50C is a top view of a screen assembly according to the present invention. FIG. 50D is a side cross-section view of the screen assembly of FIG. 50C.

FIG. 50E is a top view of a screen assembly according to the present invention. FIG. 50F is a side cross-section view of the screen assembly of FIG. 50E.

FIG. 50G is a top view of a screen assembly according to the present invention.

FIG. 51 is a side view of a wear strip according to the present invention.

DESCRIPTION OF EMBODIMENTS PREFERRED AT THE TIME OF FILING FOR THIS PATENT

Figure 5:
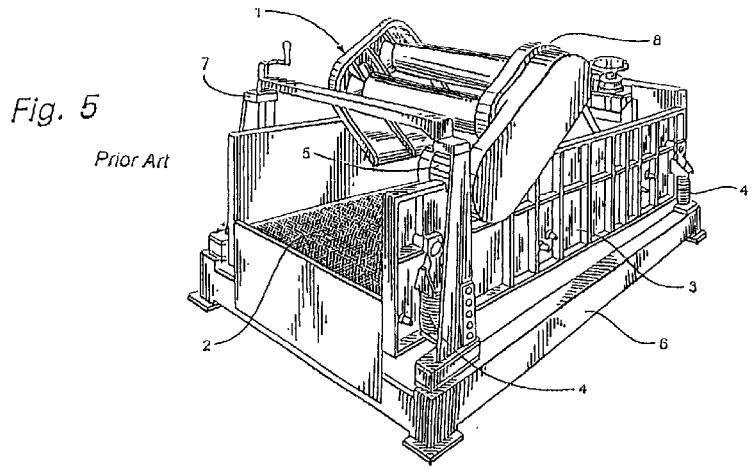
FIG. 5 is a perspective view of and FIG. 6 is a schematic view of a prior art shale shaker.
Figure 6:
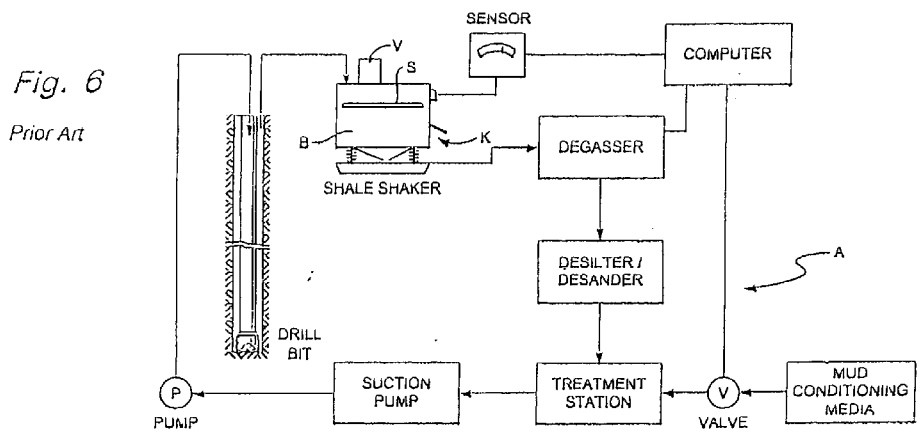

FIGS. 1A and 1B show a screen assembly 10 according to the present invention which has a perforated plate 11 on which is mounted three layers 12 of mesh or screening material. One, two, four, or more layers of screening material may be used. The plate 11 has a plurality of side holes 18 on each of two of its sides for receiving releasable fasteners for mounting the screen 10 in a suitable shale shaker. Optionally, the screen assembly's plate 11 may also have inner portions 15 with holes 16 therethrough and/or inner portions 15a with interior holes 16a therethrough which holes are also for receiving releasable fasteners for releasably connecting the screen assembly to the shale shaker. To insert the fasteners through the holes 16, 16a and 18 into holes in a deck or bed below a screen assembly, corresponding and appropriate holes or openings are made in the screening material. Although the entire inner portions 15a are revealed in FIG. 1A, in an actual screen assembly, prior to making holes in screening material, the holes 16a and inner portions 15a are covered by screening material.

FIG. 2A shows a fastener system 20 according to the present invention which has a top member 21 with a lower portion 22 that is received within a bottom member 23 which has a plurality of spaced-apart fingers 24. The lower portion 22 upon insertion into the bottom member 23 forces the fingers 24 apart for a tight friction fit of the lower portion 22 within the bottom member 23. An upper shoulder 25 of the bottom member 23 abuts the top surface of a screen assembly SC which may be any screen assembly according to the present invention. A shale shaker deck 26 has a hole 27 corresponding to a hole 27a through the screen assembly SC through which is mounted the bottom member 23. Any fastener hole in any screen assembly or part thereof according to the present invention and/or any corresponding hole through a shaker deck according to the present invention may have any desired opening shape as viewed from above, including, but not limited to, rectangular, triangular, elliptical, oval, pentagonal, circular, and hexagonal.

FIG. 2B shows the fastener system 20 releasbly holding the screen assembly SC to the shaker deck 26. Spaced apart shoulders 28 and 29 of the top member 21 provide an abutment against the screen assembly SC (the bottom shoulder 28) and a structure (the top shoulder 29) to grasp or contact to facilitate removal of the fastener.

FIGS. 3A and 3B show another embodiment of a fastener system according to the present invention for releasably connecting a screen assembly to a shale shaker. A system 30 has a fastener 31 with a body 32 and a lower inflatable member 33. A stop shoulder 39 on the body 32 abuts the top of a screen assembly SC (like that of FIG. 2A). Following insertion of the body 32 through a hole 34 in the screen assembly SC (see FIG. 3A), the inflatable member 33 is inflated through valve apparatus 35 to hold the fastener (and thus the screen assembly) in place. To release the fastener, the valve apparatus is activated to allow air to escape from the inflated inflatable member 33. The inflatable member 33 is sized and positioned so that, upon inflation, it abuts an underside of the deck 36 (like the deck 26, FIG. 2A) of a shale shaker.

FIG. 4 shows a fastener 40 for releasably connecting a screen assembly SC (like that of FIG. 2A) to a shale shaker with a deck 46 (like the deck 26, FIG. 2A). The fastener 40 has a body 41 that is inserted through a hole 42 in the screen assembly SC. Optional threads 43 on the fastener body 41 mate with corresponding threads 44 on the deck 46 to releasbly hold the fastener, and thus the screen assembly, in place. Any fastener according to the present invention and any deck according to the present invention may have such threads. Optionally, the threads are deleted and the fastener is held in place with a friction fit; and/or, glue, epoxy, or an adhesive is used to hold the fastener in position (as may be done, optionally, with any other fastener disclosed herein); or a non-threaded locking fastener is used with required holes and/or surfaces on the shaker deck or bed. Any suitable screw or bolt may be used for the body 41. Optionally, the fastener 40 has a top head 45 that facilitates turning of and removal of the fastener 40. Any fastener in FIGS. 2A–4 may be used with any screen assembly disclosed herein.

It is within the scope of this invention for the screen assembly SC to have one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the plate 11 in any known manner. Any such layer or layers of screening material may be substantially flat or may be undulating (with a series of alternating ridges and valleys) as is well known in the art. According to the present invention any known support, plate, strip support, or frame for supporting a shale shaker screen and/or for mounting thereto of one or more layers of screening material, mesh, and/or cloth may have one or more holes for receiving one or more fasteners according to the present invention for releasably connecting a screen assembly to a shale shaker.

Figure 7:
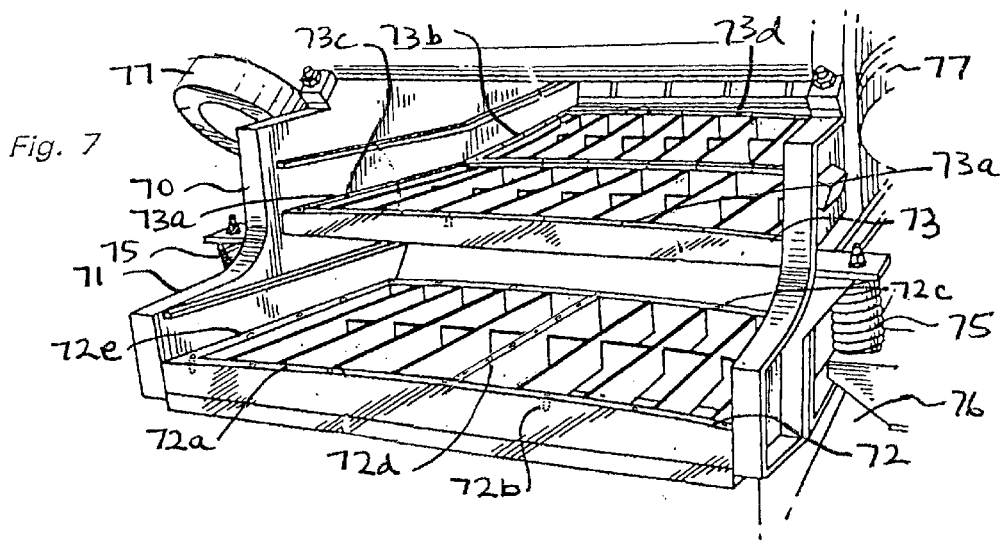
FIGS. 7–9 are perspective views of shale shakers according to the present invention.

FIG. 7 shows a shale shaker 70 according to the present invention which is like a shaker disclosed in U.S. Pat. No. 5,641,070 co-owned with the present invention and incorporated fully herein for all purposes; but the shaker 70 has a basket 71 with screen mounting decks 72 and 73. Supports 72a and 73a of the decks 72 and 73, respectively, have holes 72b, 72c, 72d and 72e therethrough (in deck 72) and 73a, 73b, 73c (in deck 73). As desired such holes may be provided on all sides and/or on all cross-members of either or both decks. These holes are sized and positioned to correspond to holes in a screen support (and, optionally, holes through screening mesh and/or cloth) of screen assemblies (not shown) to be mounted in the basket 71. Springs 75 (two shown; four, six or more may be used) support the basket in a shaker body 76 and one or more vibrators 77 connected to the basket 71 vibrate the basket 71. Holes as in either or both decks 72, 73 may be provided for the deck(s) of any known multi-deck shale shaker so that screen assemblies according to the present invention with holes according to the present invention may be releasably fastened thereto.

Figure 8:
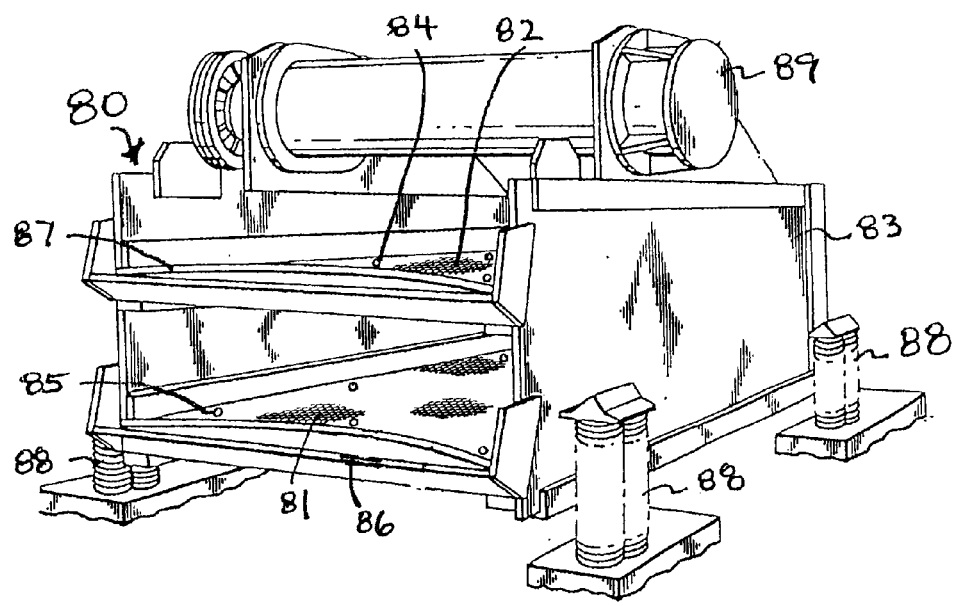

FIG. 8 shows a shale shaker 80 according to the present invention with screen assemblies 81, 82 according to the present invention mounted in a basket 83 to decks 86, 87 with fasteners 84, 85 which may be any screen assembly disclosed herein according to the present invention. The fasteners 84, 85 extend through holes (not shown) in the screen assemblies into holes (not shown) in the decks 86, 87. The basket 83 is mounted on spring mounts 88 (three shown; four used in this embodiment) and is vibrated by a vibrator 89.

Figure 9:
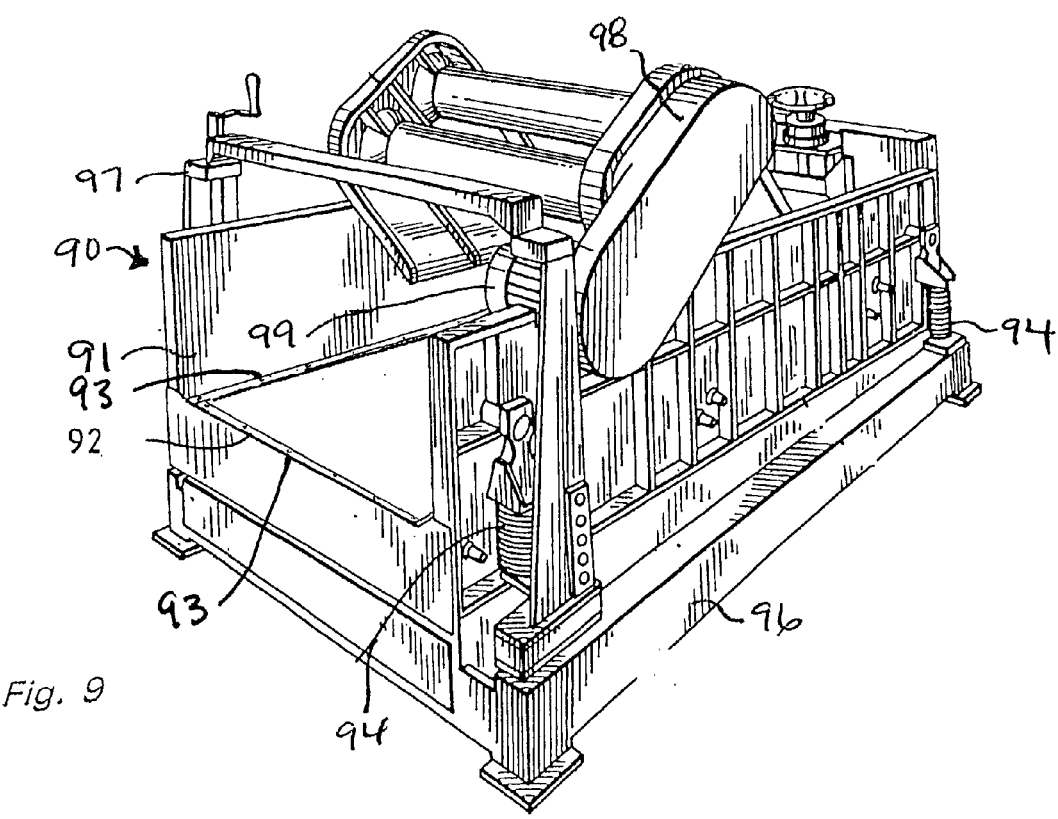

Referring now to FIG. 9, a shale shaker 90 according to the present invention has a screen deck 92 according to the present invention in a basket 91. The deck 92 has holes 93 therearound into which are releasably inserted fasteners (not shown; including, but not limited to, fasteners as disclosed herein and/or fasteners according to the present invention) to releasably secure one or more screen assemblies (not shown) to the deck 92. Any screen according to the present invention may be used on the deck 92. The basket 91 is mounted on springs 94 (only two shown; two as shown are on the opposite side) which are supported from a frame 96. The basket 91 is vibrated by a motor 99 and interconnected vibrating apparatus 98 which is mounted on the basket 91 for vibrating the basket and the screens. Optional elevator apparatus 97 provides for raising and lowering of the basket end.

Figure 10A:
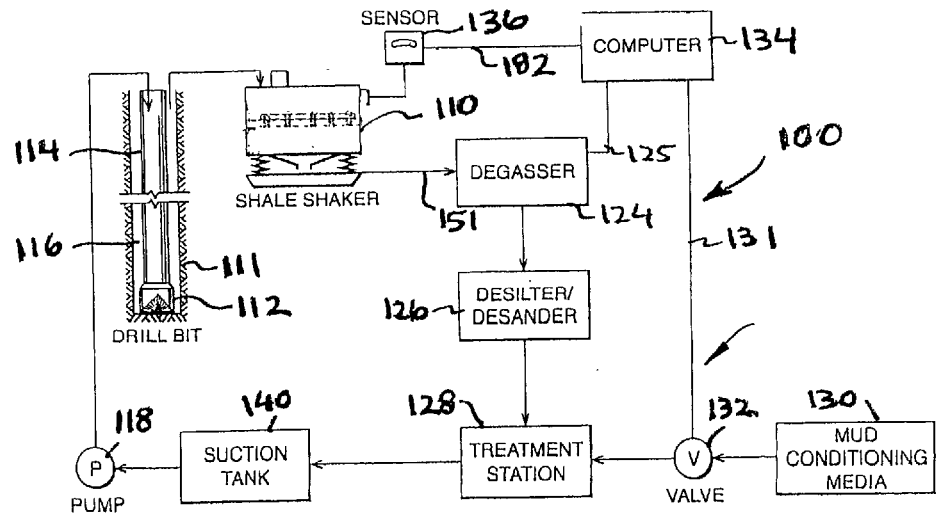
FIG. 10A is a schematic view of a system according to the present invention.
Figure 10B:
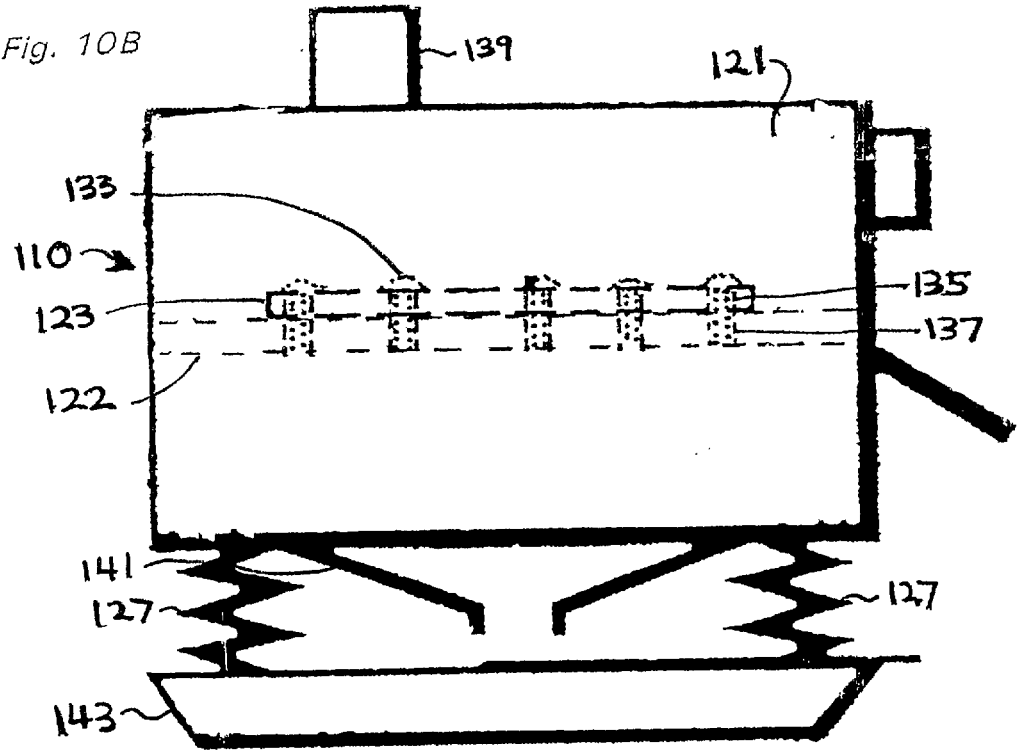
FIG. 10B shows a shale shaker of the system of FIG. 10A.

Referring now to FIGS. 10A and 10B a well 111 is being drilled by a bit 112 carried on a string of drill pip 114. Drilling mud is pumped by a pump 118 into the drill pipe 114 and out through nozzles in the bit 112. The mud cools and cleans the cutters of the bit and then passes up through a well annulus 116 flushing cuttings out with it.

After the mud is removed from the well annulus 116, it is treated before being pumped back into the pipe 114. First, the mud enters the shale shaker 110 where relatively large cuttings are re moved. The mud then enters a degasser 124 where gas can be removed if necessary. Degasser 124 may be automatically turned on and off, as needed, in response to an electric or other suitable signal produced by a computer 124 and communicated to degasser 124 as indicated by line 125. The computer 1344 produces the signal as a function of data from a sensor assembly 136 associated with shale shaker 110 and described more fully below. The data from sensor assembly 136 is communicated to computer 134 by line 182. The mud then passes to a desander and (or a desilter), jointly represented by station 126, for removal of smaller solids picked up in the well.

The mud next passes to a treating station 128 where, if necessary, conditioning media, such as barite, may be added from source 130. As shown, suitable flow control means, indicated in a simplified form by valve 132, controls flow of media from source 130 to station 128. Valve 132, in turn, may be automatically operated by an electric or other suitable signal produced by computer 134 as a function of the data from sensor assembly 136, such signal being communicated to valve 132 as indicated by line 131.

From the station 128, the mud is directed to tank 140, from which pump 118 takes suction, to be re-cycled through the well. Any shale shaker disclosed herein may be substituted for the shale shaker 110. The system 100 is like the systems disclosed in U.S. Pat. No. 5,190,645 (incorporated fully herein for all purposes), but the system 100 has a shake shaker according to the present invention.

The shale shaker 110 as shown in detail in FIG. 10B has a basket 121 in which a screen mounting deck 122 (shown schematically in FIG. 10B). A screen assembly 123 according to the present invention (shown schematically) is releasably secured to the deck 122 by a plurality of spaced-apart fasteners 133 which extend through holes 135 in the screen assembly 123 and through corresponding holes 137 in the deck 122. Vibrator apparatus 139 vibrates the basket 121 which is mounted on mounts 127. Material flows through exit structure 141 into a collection receptacle 143.

The screen assembly 123 may be any (one, two, three or more) screen assembly according to the present invention and the fasteners 133 may be any fastener according to the present invention.

Figure 11:
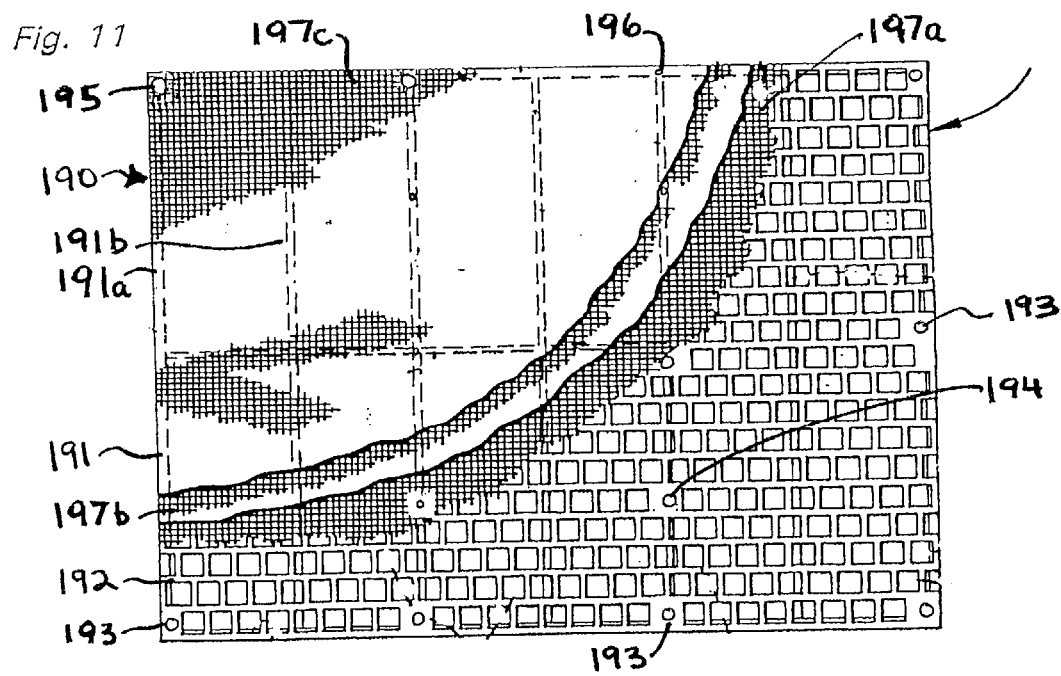
FIGS. 11, 12, 13 and 15 are top views of screen assemblies according to the present invention.

FIG. 11 shows a screen assembly 190 according to the present invention which has a lower tubular frame support 191 to which is connected and/or welded a perforated plate 192 (including, but not limited to a perforated plate like that disclosed in U.S. Pat. No. 4,575,421, incorporated fully herein for all purposes; but with holes according to the present invention for receiving fasteners according to the present invention to releasably connect the screen assembly 190 to a shale shaker).

The perforated plate 191 of the screen assembly 190 has a plurality of peripheral holes 193 and a plurality of interior holes 194 (either holes 193 or holes 194 may be deleted—as is the case for any support, plate, or frame according to the present invention). A plurality of fasteners 195 (two shown; one through each hole 193, 194) connect the plate 192 to the tubular frame support 191. The fasteners' lower ends are received in holes 196 of the tubular frame support 191 whose position corresponds to that of the holes 193, 194.

As shown in FIG. 11 there are three layers 197a, 197b, 197c of screening material on the plate 192. Any one or two of these layers may be deleted; any known combination of layers may be used; and the layers may or may not be connected and/or bonded together at their edges and/or across their surfaces in any known manner with any known material and/or process. Any known suitable tubular members may be used to make the tubular frame support 191 with its outer members 191a and its cross-members 191b.

Figure 12:
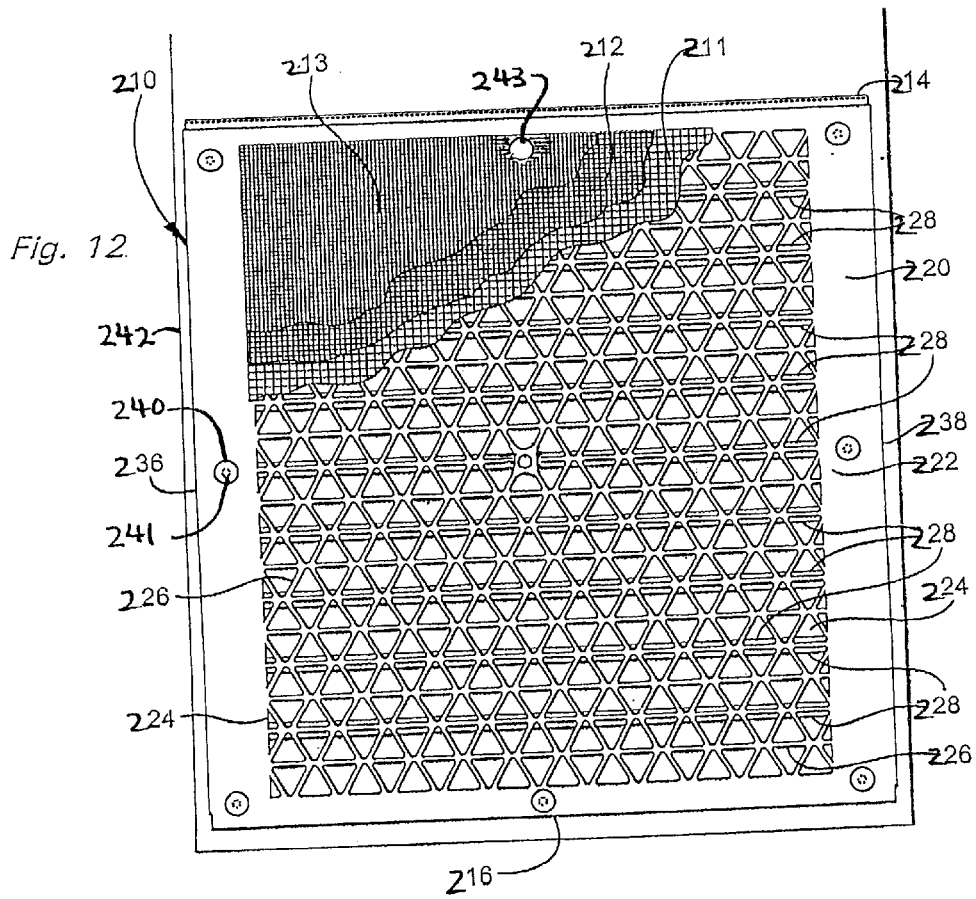

FIG. 12 shows a screen assembly 210 according to the present invention with a unibody structure 220 according to the present invention. The screen assembly 210 has, optionally, three 211, 212, 213 of screening material (shown partially; extending over the entire open area of the unibody structure 220) bonded to a top surface 222 of the unibody structure 220. Preferably, the layers 211, 212, 213 are also bonded together over substantially their entire surface area. A plurality of fasteners 240 extend through holes 241 in the unibody structure 220 to releasably connect the screen assembly 210 to a screen mounting deck 242 of a shale shaker (not shown in its entirety). Optionally, one or more fasteners 243 (one shown) may extend through the layers of screening material on the screen assembly 210 and into the deck 242.

A plurality of openings 224 through the unibody structure 220 define a plurality of support members 226. To the underside of the unibody structure 220 are, optionally, connected a plurality of spaced-apart ribs 228 which, in one aspect are welded to a metal unibody structure 220. In this particular embodiment the ribs 228 are positioned along a substantial majority of their length directly beneath one of the support members 226 that extend across a major portion of the unibody structure 220; but it is within the scope of this invention to use no such ribs or to position them anywhere on the underside of the unibody structure 220. The unibody structure 220 has spaced-apart sides 236, 238. The screen assembly 210 has an end 214 and a ledge end 216. The ledge end has an upper ledge portion that rests on a shoulder of an end of an adjacent screen. Thus one screen end seals against another screen end when such screens are used end-to-end (as described in U.S. Pat. No. 6,283,302 co-owned with the present invention as incorporated fully here for all purposes).

Figure 13:
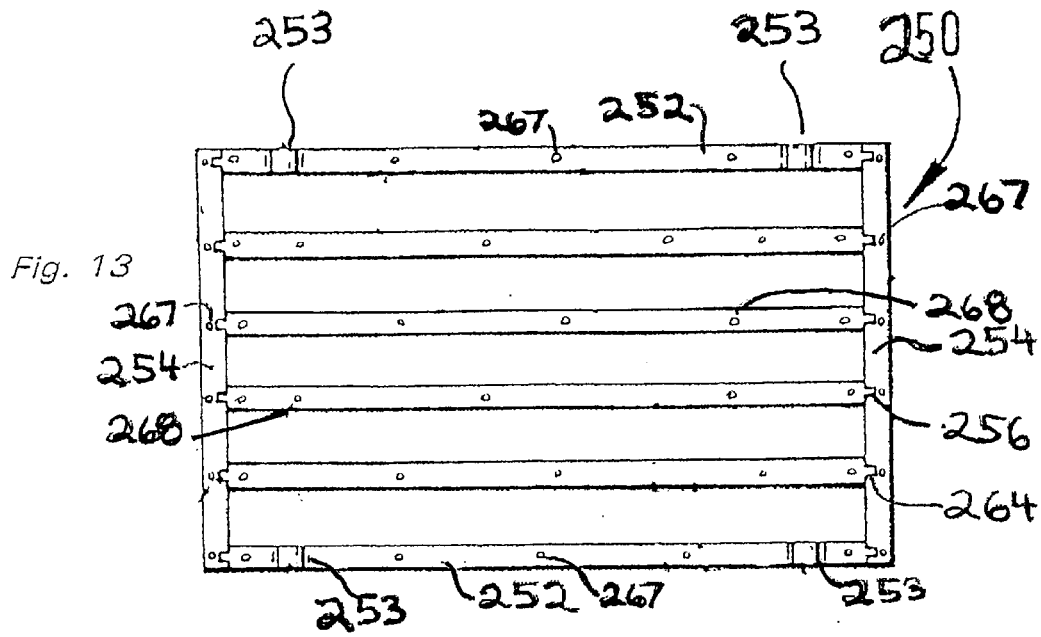

FIG. 13 shows a screen strip support 250, according to the present invention with a plurality of spaced-apart strips 252 (made of any suitable metal or metal-like material) secured to and between spaced-apart sides 254. The screen strip support 250 is like the strip support of FIG. 51A, U.S. Pat. No. 6,290,068 (co-owned wit the present invention and incorporated fully herein for all purposes); but the screen strip support 250 has outer holes 267 and inner holes 268 through which may be inserted any fastener disclosed herein for releasably connecting the support 250 (and any screen assembly of which it is a part) to a shale shaker deck. Either holes 267 or holes 268 may be deleted. Any known strip support may be provided, according to the present invention, with holes 267 and/or holes 268. Each end 256 of each strip 252 is received and held in a recess 264 in a side 254. The recess 264 corresponds in shape to the shape of the end 256 and a shoulder 266 of each strip 252 abuts a side 254. The end 256 may be inserted into the recess 254 from the side or from above or below. The top and bottom strips 252 each has two humps or ridges 253 which are located, sized, and configured to be received in corresponding corrugations of a corrugated plate and/or corrugated screen assembly. it is within the scope of this invention for each strip to have one, two, or a plurality of multiple humps or ridges. In one aspect there is one hump or ridge for each corrugation on a superimposed plate and/or screen assembly. It is within the scope of this invention to delete the humps and/or ridges so that the strips 252 are flat for use with flat mesh and/or screen(s).

Figure 14A:
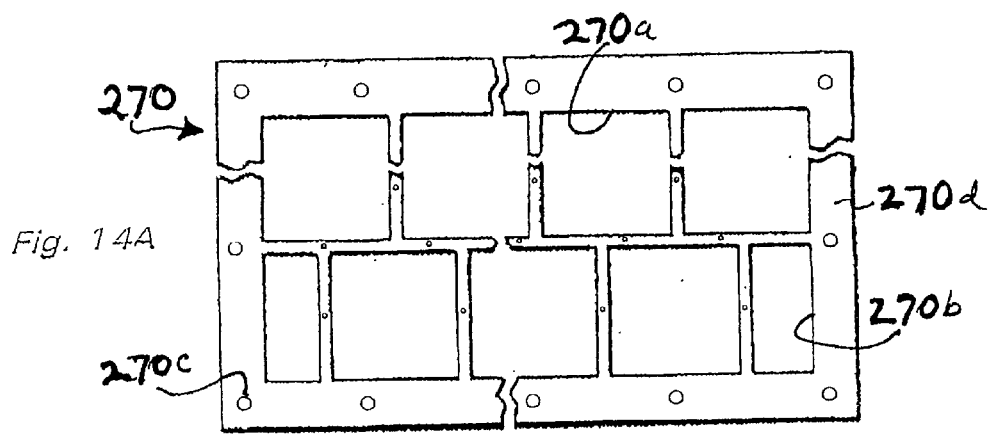
FIG. 14A is a top view of a plastic grid according to the present invention.
Figure 14B:
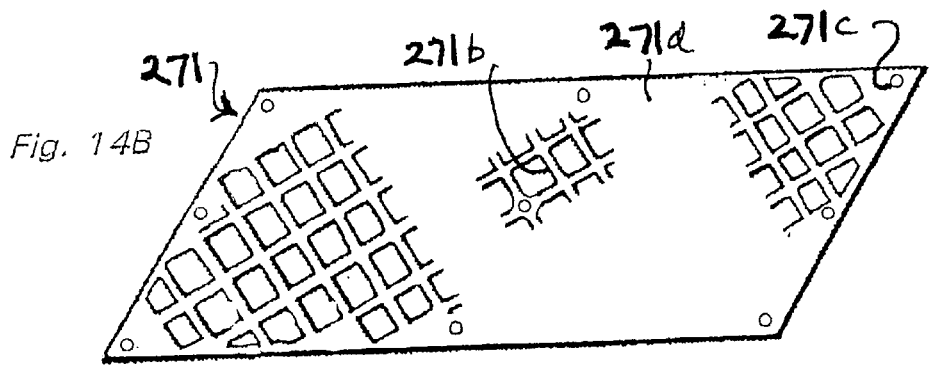
FIG. 14B is a perspective view of a plastic grid according to the present invention.

FIGS. 14A and 14B show plastic grids 270, 271, respectively, each with a body 270d, 271d respectively with a plurality of openings 270a, 270b, 271b respectively, therethrough. Although only certain of the openings 271b are shown, it is to be understood they extend across the entire surface of the body 271d. The plastic grids 270, 271 are like plastic grids disclosed in U.S. Pat. Nos. 5,417,859; 5,958, 236; 5,783,077; and 6,053,332 (all these patents incorporated fully herein for all purposes); but the grids 270, 271 each have a plurality of spaced-apart holes 270c, 271c, respectively therethrough for accommodating fasteners according to the present invention which extend through a screen assembly according to the present invention to releasably connect a screen assembly to a shale shaker. Any grid disclosed in the patents cited above and any known plastic grid or piece used in a screen assembly for a shale shaker may have holes as shown in FIGS. 14A and 14B (and/or any holes disclosed herein for any perforated plate or support disclosed herein); and any screen or screen assembly disclosed in the patents cited above may have any such grid or piece. Any such grid or piece according to the present invention may have holes corresponding to any fastener holes as described herein. In one aspect the holes in the grid or piece are made, according to the present invention, prior to the final formation or assembly of a screen or screen assembly (as may also be the case with any perforated plate or strip support according to the present invention); while in another aspect the holes are made through the plastic grid (and/or through other parts, pieces and/or layers of the screen or screen assembly) following final formation or assembly thereof (as may also be the case with any perforated plate, frame or strip support according to the present invention). It is to be understood that it is within the scope of the present invention to have a plastic layer or a mass of fusing plastic fusing together layers of screening material, the layer or mass optionally provided initially by a plastic grid, the plastic layer or mass having holes for fasteners corresponding to holes in a screening material support.

Figure 15:
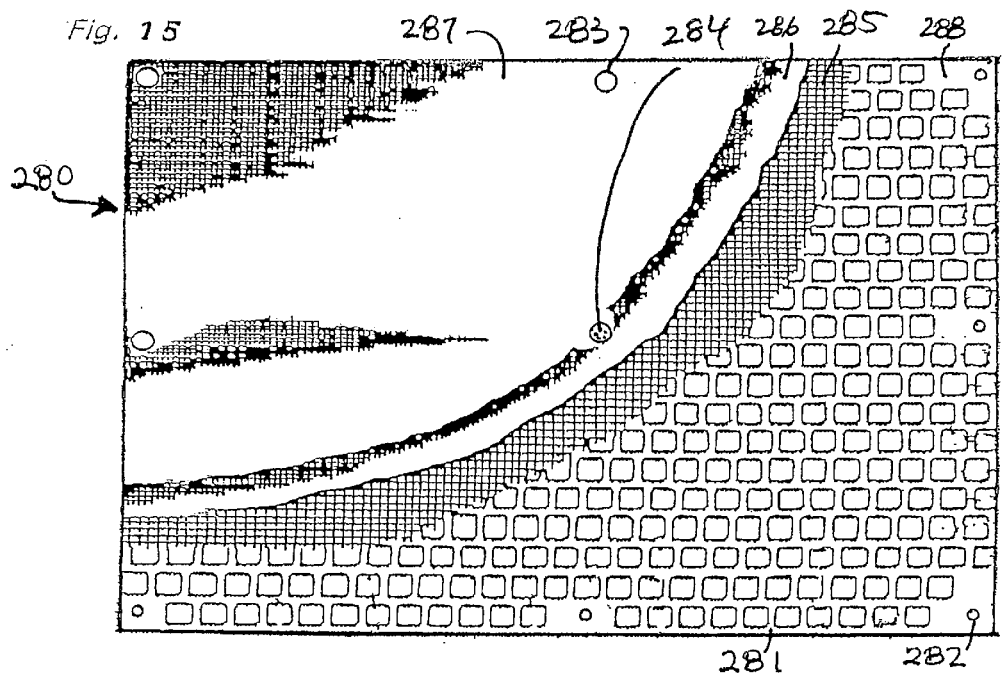

FIG. 15 shows a screen assembly 280 according to the present invention with a lower supporting perforated plate 281 according to the present invention. The screen assembly 280 is like those disclosed, e.g., in U.S. Pat. No. 4,575,421 (incorporated fully herein for all purposes; but without hookstrip mounting apparatus and with a plurality of peripheral holes 282 and one or more interior holes 284 for receiving fasteners 283 to releasably connect the screen assembly 280 to a shale shaker (not shown) whose deck or mounting structure has corresponding holes for releasably receiving a portion of the fasteners 283 (as is the case for a shale shaker and fasteners through any screen or screen assembly according to the present invention). In certain preferred aspects holes 282 and/or 284 are simply added to a perforated plate as shown in U.S. Pat. No. 4,575,421; while in other aspects the plate is initially made so that plate portions 288 have only a hole 282 or a hole 284. In one particular aspect (as is true for any perforated plate according to the present invention) an area like the areas 288 (and/or like the areas 15, FIG. 1A and/or like the areas around the holes 193, 194, FIG. 11 and for any plastic grid or piece according to the present invention) are at least as large (viewed from above) as one of the openings or perforations through the plate and in another preferred aspect are at least twice as large (viewed from above) as such an opening or perforation.

One, two, or three (or more) layers of mesh and/or screening material may, according to the present invention, be used on a perforated plate 280 (or on any perforated plate according to the present invention); e.g., as shown in FIG. 15, three layers 285, 286, and 287 are used on the plate 281. Although these layers are shown partially, it is to be understood they substantially cover the plate 281.

Figure 16:
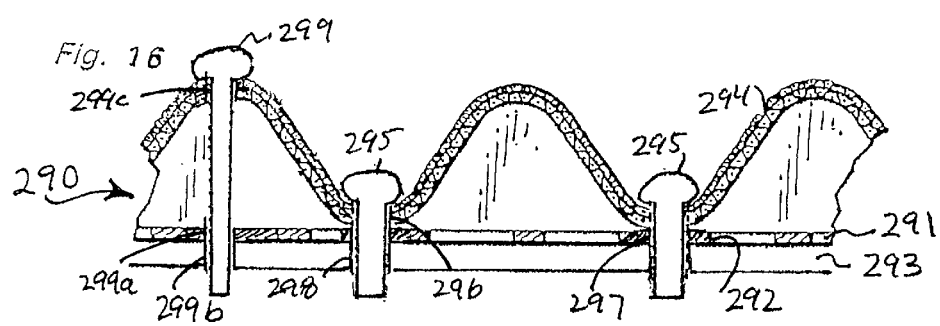
FIG. 16 is a cross-sectional view of a screen assembly according to the present invention.

The prior art discloses a variety of non-flat screens and screen assemblies sometimes referred to as "3D" or "Three Dimensional" screens (e.g., but not limited to, as disclosed in U.S. Pat. Nos. 5,417,793; 5,417,858; 5,417,859; 6,053,332; 5,598,236; 5,783,077; 6,283,302; 6,290,068—all incorporated fully herein for all purposes). FIG. 16 illustrates that, according to the present invention, non-flat screen assemblies may be fastened with releasable fasteners passing through holes therethrough to a shale shaker. A screen assembly 290 (shown partially) has a lower perforated plate 291 (which, optionally, may be any support plate, frame, or strip support) with a plurality of spaced-apart openings 292 therethrough (see, e.g., but not limited to, FIG. 13, U.S. Pat. No. 5,417,858; and FIG. 3, U.S. Pat. No. 5,417,859 regarding possible plates and screening material). A plurality of fasteners 295 passing through holes 296 (in screening material 294), holes 297 (in the plate 291) and into (and, optionally, through) holes 298 (in a shaker deck 293).

As shown in FIG. 16, it is also within the scope of this invention to employ one or more fasteners 299 which extend through a portion of the screening material 294 that is not directly adjacent the plate 291 but which is spaced-apart therefrom. As shown a fastener 299 passes through a highest (with respect to the plate 291 as viewed in FIG. 16) portion of the screening material 294 and through holes 299a, and 299b, in the plate 291 and deck 293, respectively, and through a hole 299c in the material 2924; but it is within the scope of this invention to have one or more fasteners 299 (or 295) pass through any part or portion of the screening material 294. As may be the case with any fastener according to the present invention and any fastener used with a screen assembly according to the present invention, any suitable desired washer(s) and/or sleeve(s) may be used with the fastener(s) 295, 299 at any interface and/or for any hole.

Figure 17:
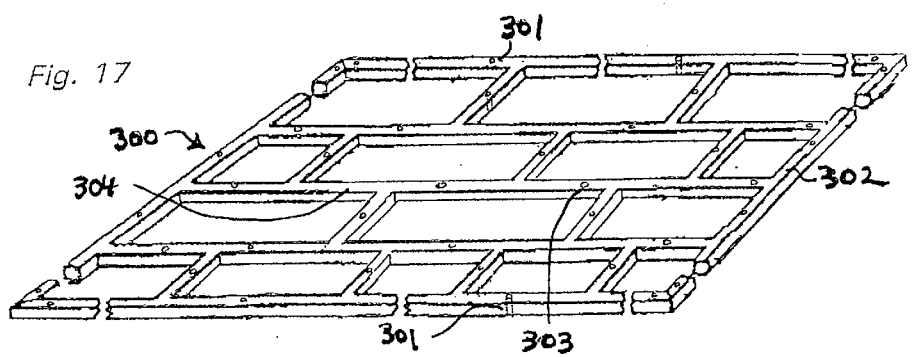
FIG. 17 is a perspective view of a frame support for a screen assembly according to the present invention.
Figure 18A:
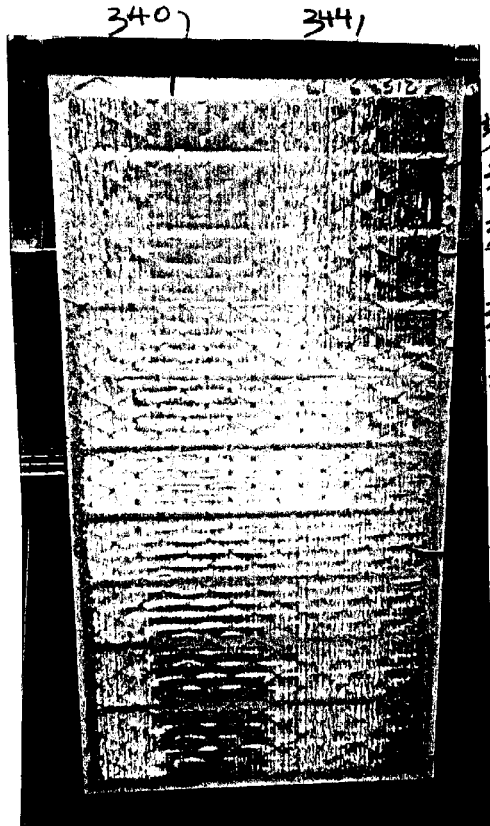
FIG. 18A is a top view of a screen assembly according to the present invention.
Figure 18B:
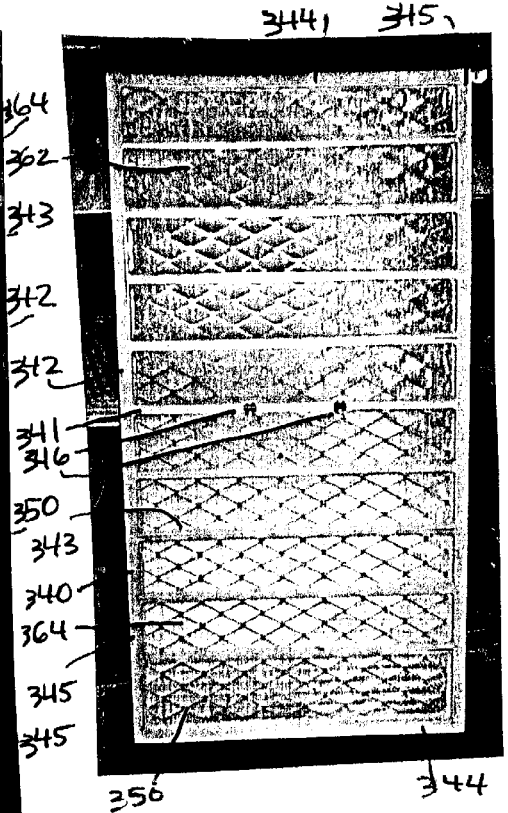
FIG. 18B is a bottom view of the screen assembly of FIG. 18A.
Figure 18C:
FIG. 18C is an end view of one end of the screen assembly of FIG. 18A (and the opposing end is identical to that of FIG. 18C).
Figure 18D:
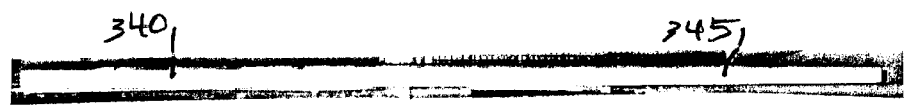
FIG. 18D is a side view of one side of the screen assembly of FIG. 18A (and the opposing side is identical to that of FIG. 18C).

It is within the scope of the present invention to provide holes for fasteners as disclosed herein in any known prior art frame used as a support for screening material for a screen assembly for a shale shaker. FIG. 17 illustrates a frame 300 according to the present invention which is like a frame as disclosed in U.S. Pat. No. 5,417,858, FIG. 8; but which has a series of outer holes 301 through tubular frame members 302 and, optionally, (or instead of the holes 301) holes 303 through interior tubular members 304. Any holes described herein for releasably fastening a screen assembly to a shale shaker may be used in the frame 300 or in any frame support for a shale shaker screen assembly. Any layer or layers of mesh or screening material described or referred to herein or known in the prior art may be used on the frame 300 or on any frame according to the present invention.

With screen assemblies according to the present invention (e.g. as in FIG. 1A) which employ no lower support frame, any opening through the lower support can receive a common plug to replace torn screening material above the opening and no frame member blocks any of the openings which could require a customized plug.

FIGS. 18A–18F show a screen assembly 340 according to the present invention which has a tubular frame 342 with ends 344 and interconnected sides 345. A screening material combination 350 is secured with cured epoxy to the tubular frame 342. A crossmember 341 (of a plurality of spaced-apart crossmembers 343 that extend between and have ends connected to the sides 345) has two notches 346, either of which is for receiving a portion of an upstanding member of a shale shaker deck.

In certain shale shakers in which screen assemblies without crossmembers such as the crossmember 341 are used, one or more upstanding members are located so that they do not push up on a screen assembly above them and such upstanding members are often used for proper screen assembly positioning, for preventing unwanted screen movement with respect to a shaker deck, or for stabilizing screen assemblies in position. Rather than removing such upstanding member(s) when a screen assembly is used that does have one or more crossmembers that would undesirably abut the top of an upstanding member (preventing correct screen assembly emplacement on a deck), a screen assembly according to the present invention may be installed on such a shaker deck so that a portion of the upstanding member (which is perpendicular to the crossmember 41 as viewed from above or below) is received in and projects into one (or more) of the notches 346. With a screen assembly 340 as shown, the crossmembers 343 on either side of the crossmember 341 are sufficiently spaced-apart from the crossmember 341 that the upstanding member does not contact the adjacent crossmembers 343. Although only one notch 346 can accommodate an upstanding member, by using two notches 346, proper emplacement of the screen assembly 340 over the upstanding member is made "fool proof"—i.e.

whichever side of the screen assembly is placed nearest the shaker's exit end (or fluid introduction end) one of the notches will be above the upstanding member. Of course it is within the scope of the present invention to place aligned notches on adjacent crossmembers to accommodate an upstanding member of such dimensions that it extends beyond the distance separating two, three, four or more crossmembers. The screen assembly 340 as shown has a multi-layer combination 350 of layers of screening material glued together with moisture curing hot melt glue in a glue pattern 362. The multi-layer glued-together combination 360 is secured to the tubular frame 342 with cured epoxy.

FIG. 19 shows a mounting structure (or "tray") 400 for a shale shaker on which is releasably securable one or more screen assemblies. As shown a screen assembly mounts on and covers tray 400, but it is within the scope of this invention to have a larger tray on which two, three or more screen assemblies are secured or to have multiple trays 400 on a single shale shaker (as is true for any tray or mounting structure according to the present invention disclosed herein). Although a particular tray is shown in FIG. 19, it is to be understood that, according to the present invention, the teachings of the various holes and projecting members for trays (e.g., as in FIGS. 19–49) are applicable to known screen mounting structures for shale shakers in which and on which the holes and and upstanding members may be used; and similarly for the screen assemblies shown in FIGS. 20A–48 the various holes and projecting members may be used with any suitable known screen assembly.

The tray 400 has two spaced-apart outer ends 402, 404 which are spaced-apart by sides 406. The entire tray 400 is positioned in and connected to a basket or other suitable enclosure or housing of a shale shaker. Crossmembers 408 extend from end to end of the tray 400 and crossmembers 410, 412 extend between crossmembers 408 and sides 406. A support member 409 extends beneath one of the crossmembers 408 (and such a support may be under any crossmember). Wear strips 414 are connected to tops of the sides 406 and wear strips 416 are on tops of some of the interior crossmembers. An upstanding member 420 projects upwardly from each end 402, 404 of the tray 400. Each upstanding member 420 is located, sized, and configured for receipt within a corresponding hole of a screen assembly placed on the tray 400. Fluid to be treated by a shale shaker with a tray as in FIG. 19 (or any tray disclosed herein) may flow across a screen assembly placed on the tray in any desired direction; and one such direction is indicated by the arrows AA and BB in FIG. 19.

FIGS. 20A–20D show a screen assembly 430 according to the present invention which has a lower support frame 432 (which may be any known screen assembly support frame or which may, alternatively, be any known screen assembly support such as a strip support, perforated plate, or unibody structure). Screening material 434 (shown partially, but covering the frame 432) is on the top of the frame 432 and may be any known screening material used in screen assemblies for shale shakers, including, but not limited to, multi-layer screen meshes and/or flat or 3-D materials. A lower bar 436 is connected to or formed integrally of the frame 432 at each of its ends. Each end of the screen assembly 430 has a hole 438 for receiving a member projecting upwardly from a shale shaker's screen mounting structure, e.g., but not limited to, like the upstanding members 420, FIG. 19. The holes 438 do not extend through the top of the frame 432.

FIG. 20E shows possible shapes 439a, b, c, d, e, f, g, h, i and j as viewed from above, for any upstanding member or upwardly projecting member according to the present invention, and also for holes corresponding to such upstanding or upwardly projecting members.

Figure 21:
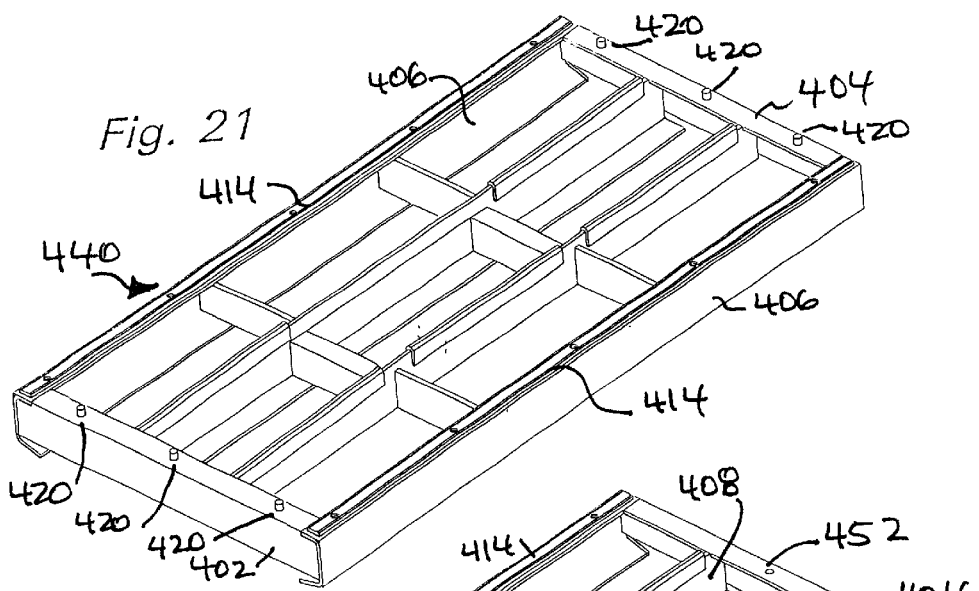
FIG. 21 is a perspective view of a screen assembly mounting structure for a shale shaker according to the present invention.

FIG. 21 shows a tray 440 according to the present invention which is like the tray 400 (and like parts are designated with the same numerals), FIG. 19; but which has three upstanding members 420 at each of its ends, each for receipt within corresponding holes of a screen assembly to be emplaced on the tray 400. Tray ends or sides according to the present invention may have any desired number of upstanding or upwardldy projecting members for receipt within corresponding holes of a screen assembly.

Figure 22:
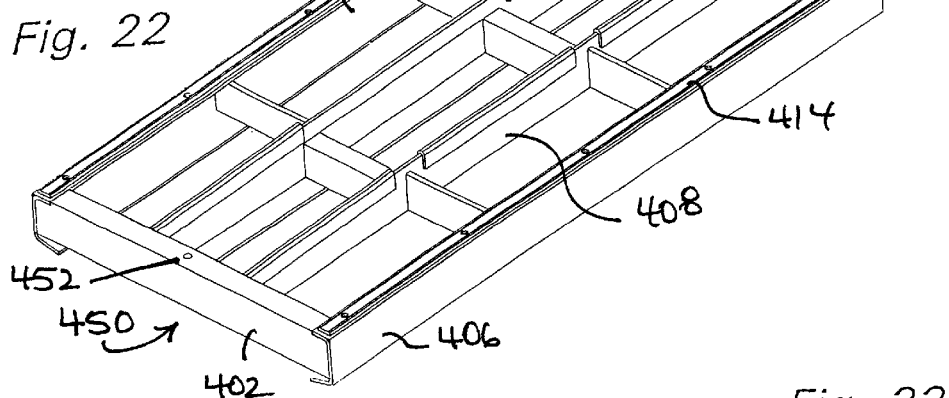
FIG. 22 is a perspective view of a screen assembly mounting structure for a shale shaker according to the present invention.
Figures 23A, 23B:
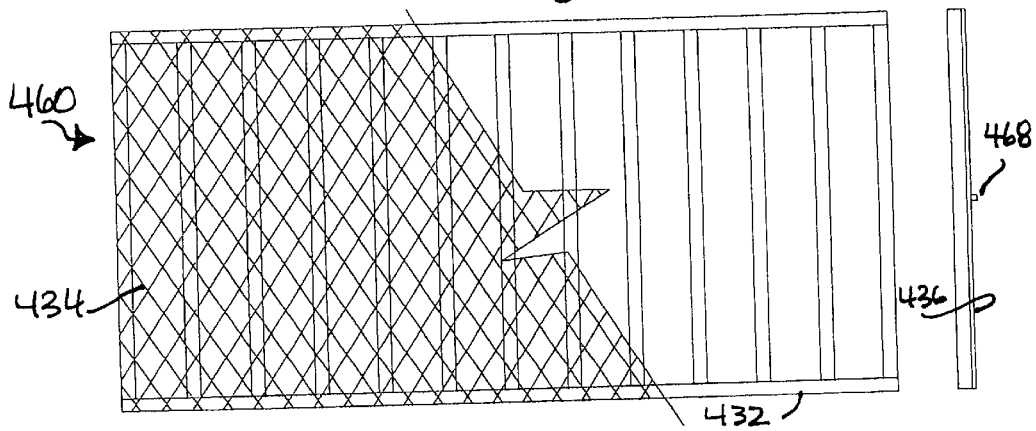
FIG. 23A is a top view of a screen assembly according to the present invention.
FIG. 23B is an end view.

FIG. 22 shows a tray 450 like the tray 400 (and like parts are designated with the same numerals); but without any upstanding members 420 and with a hole 452 in each of its ends. The holes 452 are located, sized, and configured for receiving corresponding downwardly projecting members of a screen assembly emplaced on the tray 450.

FIGS. 23A–23D show a screen assembly 460 according to the present invention like the screen assembly 430, FIG. 20A, and like numerals designate like parts. Instead of holes 438, however, the screen assembly 460 has downwardly projecting members 468 on each of its ends. The downwardly projecting members 468 are located, sized, and configured for receipt within corresponding holes in a shale shaker's screen mounting structure, e.g., but not limited to, such as the holes 4552, FIG. 22.

FIG. 24 shows a tray 470 according to the present invention like the trays 400 (FIG. 19) and 450 (FIG. 22); but with two upstanding members 472 at each of its ends and a hole 474 in each of its ends. Each upstanding member 472 is located, sized and configured for receipt within a corresponding hole of a screen assembly and the hole 474 is located, sized and configured for receiving a corresponding downwardly projecting member of a screen assembly. Either one or both of the upstanding members 472 may be deleted; there may be three or more upstanding members 4742; the hole 474 may be deleted; and/or there may be two, three or more holes 474—as is true for any tray according to the present invention.

FIGS. 25A–25H show schematically shale shakers according to the present invention with shale shaker decks (screen mounting structures) according to the present invention. The shale shakers of FIGS. 25A–25H are like the shale shaker of FIG. 10B and like numerals designate the same parts. It is within the scope of the present invention to employ any of the holes or upstanding members in FIGS. 25A–26H on any shale shaker mounting structure disclosed herein. Also, any screen assembly disclosed herein can have the hole(s) and/or downwardly projecting members of the screen assembly of FIG. 25G. It is to be understood that although the drawings of FIGS. 25A–25H show upstanding members or holes at only one side of a deck, the other side (not shown) of the deck may have the same structure, or it may have none of the structure shown.

A shale shaker 480 shown in FIG. 25A has a plurality of spaced-apart holes 481, each hole for receiving a corresponding downwardly projecting member of a screen assembly placed on the shale shaker's deck. The holes 481 extend down substantially perpendicularly into the deck 122. Any number of holes 481 may be mused (one–four or more).

A shale shaker 482 shown in FIG. 25B has a plurality of spaced-apart holes 483, each hole for receiving a corresponding downwardly projecting member of a screen assembly placed on the shale shaker's deck. The holes 483 extend down at an angle (toward the left) into the deck 122. Any number of holes 483 may be used (one–four or more) and they may extend into the deck 122 at any desired angle, including, but not limited to, angled toward or away from a fluid introduction end or fluid exit end.

A shale shaker 484 shown in FIG. 25C has a plurality of spaced-apart holes 485, each hole for receiving a corresponding downwardly projecting member of a screen assembly placed on the shale shaker's deck. The holes 485 extend down at an angle into the deck 122. Any number of holes 485 may be used (one–four or more) and they may be angled at any desired angle in any desired direction.

A shale shaker 486 shown in FIG. 25D has a plurality of spaced-apart upstanding members 487, each hole for receipt within a corresponding hole of a screen assembly placed on the shale shaker's deck. The upstanding members 487 extend up substantially perpendicularly to the deck 122. Any number of members 487 may be used (one–four or more).

A shale shaker 488 shown in FIG. 25E has a plurality of spaced-apart upstanding members 489, each for receipt within a corresponding hole of a screen assembly placed on the shale shaker's deck. The upstanding members 489 extend up at an angle to the deck 122. Any number of members 489 may be used (one–four or more) and they may project from the deck at any desired angle in any desired direction.

A shale shaker 489 shown in FIG. 25F has a plurality of spaced-apart upstanding members 491, each for receipt within a corresponding hole of a screen assembly placed on the shale shaker's deck. The upstanding members 491 extend up at an angle to the deck 122. Any number of upstanding members 491 may be used (one–four or more) and they may be at any desired angle in any desired direction.

A shale shaker 492 shown in FIG. 25H has a plurality of spaced-apart holes 493, each hole for receiving a corresponding downwardly projecting member of a screen assembly placed on the shale shaker's deck and a plurality of spaced-apart upstanding members 494 projecting up from the deck 122. The holes 493 extend down substantially perpendicularly into the deck 122 (but may be at any angle at any direction) and the upstanding members 494 project up substantially perpendicularly to the deck 122, but may be at any angle in any direction. Any number of holes and/or upstanding members may be used (one–four or more).

FIG. 25G shows schematically a screen assembly 495 according to the present invention, useful on a shale shaker, which has a body or support 496 with two spaced-apart downwardly projecting members 497 and two spaced-apart holes 498. The downwardly projecting members 497 are for receipt within corresponding holes (e.g. but not limited to, such as the holes 493, FIG. 25H) in a shale shaker screen assembly mounting structure; and the holes 498 are for receiving corresponding upwardly projecting members of a shale shaker mounting structure (e.g., but not limited to, such as the upstanding members 494, FIG. 25H).

FIG. 26 shows a shale shaker 500 like the shale shaker of FIG. 19 (like numerals indicate the same parts); but with a plurality of spaced-apart upwardly projecting members 502 projecting up from the deck 92. It is to be understood, although not shown, that as desired, upstanding members 502 may be provided spaced-apart on both sides or around the entire periphery of the deck 92 (or of any shaker deck). Optionally, the holes 93 may be deleted or they may be sized for receiving downwardly projecting members of a screen assembly.

FIG. 27 shows a shale shaker 504 like that of FIG. 27 but with a plurality of spaced-apart upwardly projecting members 506 at the sides of the screen assembly mounting structures of the shale shaker. Optionally, the holes (or some of them) 72 and 73 may be deleted or they may be sized to receive a downwardly projecting member of a screen assembly.

FIG. 28 shows a wear strip 510 according to the present invention which has a body 511 and an upstanding member 512 for receipt within a corresponding hole of a screen assembly. Using openings 513 at either end of the body 511, the wear strip 510 is connectible to an end or side or crossmember of a shale shaker's screen assembly mounting structure. Each opening 513 has, optionally, a bevelled edge 514 for ease of installation, e.g., but not limited to with fasteners, bolts, screws, pins, and/or around upstanding connectors on a shale shaker mounting structure. In certain aspects the openings 513 are located so that the wear strip 510 is slipped onto corresponding upstanding members of a shale shaker mounting structure (e.g. as in FIG. 33). The wear strip (and any wear strip herein) 510 may be made of any suitable material, e.g., but not limited to fiberglass, rubber, zinc, zinc alloy, urethane, BUNA-N, aluminum, aluminum alloy, steel, stainless steel, wood, iron or plastic as may be the upstanding member 512 (as may be any wear strip or mounting structure disclosed herein).

FIGS. 29A and 29B show a wear strip 520 according to the present invention which has a body 521 and an upstanding member 522 for receipt within a corresponding hole of a screen assembly. Using openings 523 at either end of the body 521, the wear strip 520 is connectible to an end or side or crossmember of a shale shaker's screen assembly mounting structure. Each opening 523 has, optionally, a bevelled edge 524 for ease of installation, e.g., but not limited to with fasteners, bolts, screws, pins, and/or around upstanding connectors on a shale shaker mounting structure. In certain aspects the openings 523 are located so that the wear strip 520 is slipped onto corresponding upstanding members of a shale shaker mounting structure (e.g. as in FIG. 33). The wear strip (and any wear strip herein) 520 may be made of any suitable material, e.g., but not limited to fiberglass, rubber, steel, stainless steel, wood, iron or plastic as may be the upstanding member 522.

FIGS. 30A and 30B show a wear strip 530 according to the present invention which has a body 531 and an upstanding member 532 for receipt within a corresponding hole of a screen assembly. Using openings 533 at either end of the body 531, the wear strip 530 is connectible to an end or side or crossmember of a shale shaker's screen assembly mounting structure. Each opening 533 has, optionally, a bevelled edge 534 for ease of installation, e.g., but not limited to with fasteners, bolts, screws, pins, and/or around upstanding connectors on a shale shaker mounting structure. In certain aspects the openings 533 are located so that the wear strip 530 is slipped onto corresponding upstanding members of a shale shaker mounting structure (e.g. as in FIG. 33). The wear strip (and any wear strip herein) 530 may be made of any suitable material, e.g., but not limited to fiberglass, rubber, steel, stainless steel, wood, iron or plastic as may be the upstanding member 532. As with any of the wear strips in FIGS. 28–32A, any desired number of upstanding members of any desired shape may be used. Also, any such upstanding member may be formed integrally of or connected to a wear strip according to the present invention.

FIGS. 31A and 31B show a wear strip 540 according to the present invention which has a body 541 and an upstanding member 542 for receipt within a corresponding hole of a screen assembly. Using openings 543 at either end of the body 541, the wear strip 540 is connectible to an end or side or crossmember of a shale shaker's screen assembly mounting structure. Each opening 543 has, optionally, a bevelled edge 544 for ease of installation, e.g., but not limited to with fasteners, bolts, screws, pins, and/or around upstanding connectors on a shale shaker mounting structure. In certain aspects the openings 543 are located so that the wear strip 540 is slipped onto corresponding upstanding members of a shale shaker mounting structure (e.g. as in FIG. 33). The wear strip (and any wear strip herein) 540 may be made of any suitable material, e.g., but not limited to fiberglass, rubber, steel, stainless steel, wood, iron or plastic as may be the upstanding member 542.

FIGS. 32A–32C shows a wear strip 550 according to the present invention which has a body 551 and an upstanding member 552 (FIG. 32B) or 557 (FIG. 32C) for receipt within a corresponding hole of a screen assembly. Using openings 553 at either end of the body 551, the wear strip 550 is connectible to an end or side or crossmember of a shale shaker's screen assembly mounting structure. Each opening 553 has, optionally, a bevelled edge 554. Any upstanding member in any embodiment of the present invention may have a rounded surface as does the upstanding member 557. FIGS. 32D and 32E show wear strips with a hole at one end and an opening at the other end. FIG. 32D shows a wear strip 550a like the wear strip 550, FIG. 32A. The wear strip 550a has a body 551a, like the body 551 described above, with an opening 553a, like the opening 553 described above and with an upstanding member 557a, like the upstanding member 557 described above. The wear strip 550a also has a hole 573a, like the hole 573 described below. FIG. 32E shows a wear strip 550b like the wear strip 550, FIG. 32A. The wear strip 550b has a body 551b, like the body 551 described above, with an opening 613a, like the opening 613 described below and with an upstanding member 557b, like the upstanding member 557 described above. The wear strip 550b also has a hole 573b, like the hole 573 described below. The wear strips of FIGS. 32D and 32E are emplaceable on a tray with their end hole receiving an upstanding connector of the tray and with their other end opening encompassing another upstanding connector.

FIG. 33 discloses a tray 560 like the tray 400, FIG. 21 and like numerals indicate the same parts. Each end 402, 404 of the tray 560 has two spaced-apart upstanding connectors 562 useful for releasably attaching wear strips with appropriate openings (e.g., but not limited to, wear strips as in FIGS. 28–32C and 38A–41A, with appropriately sized openings) to the tray 560. Each connector 562 has a top 564 larger than a base 565 so that, e.g., upon sliding an opening (e.g., but not limited to an opening 513 of the wear strip 510, FIG. 28) around a connector 562, the top 564 abuts a top surface of the wear strip (which is made with an appropriate thickness) thereby holding the wear strip in position. One, three or more such connectors 562 may be used (with a corresponding opening or openings in a wear strip).

Figure 34A:
FIG. 34A is a top view of a wear strip according to the present invention.
Figure 34B:
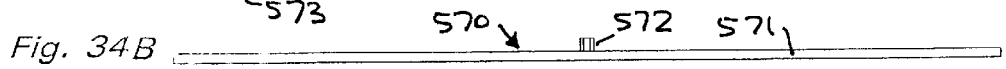
FIG. 34B is a side view of the wear strip of FIG. 34A.

FIGS. 34A and 34B show a wear strip 570 according to the present invention with a body 571 and an upstanding member 572. Holes 573 at each end of the body 571 may be used for fasteners, bolts, screws, or pins to releasably secure the wear strip to a side of a shale shaker mounting structure which has corresponding holes for the fasteners, etc. Holes 573 (and any hole in FIGS. 35A–37A) may be bevelled as shown.

Figure 35A:
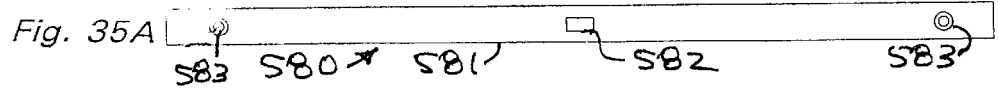
FIG. 35A is a top view of a wear strip according to the present invention.
Figure 35B:
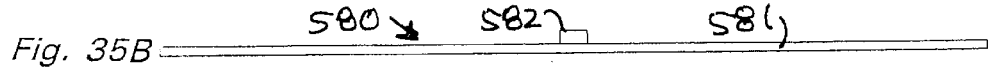
FIG. 35B is a side view of the wear strip of FIG. 35A.

FIGS. 35A and 35B show a wear strip 580 according to the present invention with a body 581 and an upstanding member 582. Holes 583 at each end of the body 581 may be used for fasteners, bolts, screws, or pins to releasably secure the wear strip to a side of a shale shaker mounting structure which has corresponding holes for the fasteners, etc.

Figure 36A:
FIG. 36A is a top view of a wear strip according to the present invention.
Figure 36B:
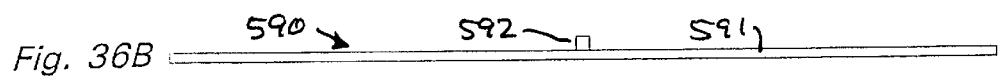
FIG. 36B is a side view of the wear strip of FIG. 36A.

FIGS. 36A and 36B show a wear strip 590 according to the present invention with a body 591 and an upstanding member 592. Holes 593 at each end of the body 591 may be used for fasteners, bolts, screws, or pins to releasably secure the wear strip to a side of a shale shaker mounting structure which has corresponding holes for the fasteners, etc.

Figure 37A:
FIG. 37A is a top view of a wear strip according to the present invention.
Figure 37B:
FIG. 37B is a side view of the wear strip of FIG. 37A.

FIGS. 37A and 37B show a wear strip 600 according to the present invention with a body 601 and an upstanding member 602. Holes 603 at each end of the body 601 may be used for fasteners, bolts, screws, or pins to releasably secure the wear strip to a side of a shale shaker mounting structure which has corresponding holes for the fasteners, etc.

Figure 38A:
FIG. 38A is a top view of a wear strip according to the present invention.
Figure 38B:
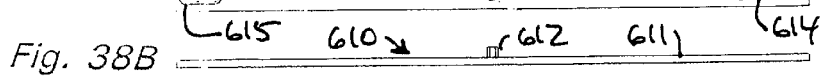
FIG. 38B is a side view of the wear strip of FIG. 38A.

FIGS. 38A and 38B show a wear strip 610 according to the present invention which has a body 611 and an upstanding member 612 for receipt within a corresponding hole of a screen assembly. Using holes 613 at either end of the body 611, the wear strip 610 is connectible to an end or side or crossmember of a shale shaker's screen assembly mounting structure. Each opening 613 has, optionally, a bevelled edge portion 614 for ease of installation. A connector on a shaker tray can be inserted through a generally round part 615 of the openings 613 and then the wear strip is moved (to the left in FIG. 38A) to secure the wear strip in place with the connectors.

Figure 39A:
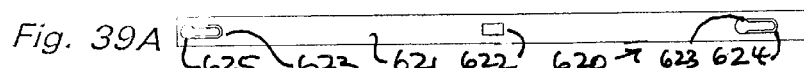
FIG. 39A is a top view of a wear strip according to the present invention.
Figure 39B:
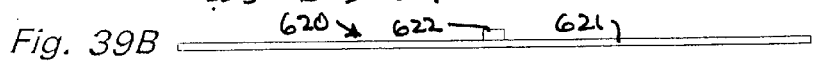
FIG. 39B is a side view of the wear strip of FIG. 39A.

FIGS. 39A and 39B show a wear strip 620 according to the present invention which has a body 621 and an upstanding member 622 for receipt within a corresponding hole of a screen assembly. Using holes 623 at either end of the body 621, the wear strip 620 is connectible to an end or side or crossmember of a shale shaker's screen assembly mounting structure. Each opening 623 has, optionally, a bevelled edge portion 624 for ease of installation. A connector on a shaker tray can be inserted through a generally round part 625 of the openings 623 and then the wear strip is moved (to the left in FIG. 39A) to secure the wear strip in place with the connectors.

Figure 40A:
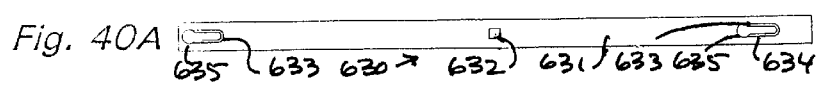
FIG. 40A is a top view of a wear strip according to the present invention.
Figure 40B:
FIG. 40B is a side view of the wear strip of FIG. 40A.

FIGS. 40A and 40B show a wear strip 630 according to the present invention which has a body 631 and an upstanding member 632 for receipt within a corresponding hole of a screen assembly. Using holes 633 at either end of the body 631, the wear strip 630 is connectible to an end or side or crossmember of a shale shaker's screen assembly mounting structure. Each opening 633 has, optionally, a bevelled edge portion 634 for ease of installation. A connector on a shaker tray can be inserted through a generally round part 635 of the openings 633 and then the wear strip is moved (to the left in FIG. 40A) to secure the wear strip in place with the connectors.

Figure 41A:
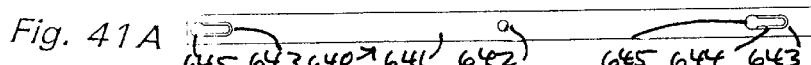
FIG. 41A is a top view of a wear strip according to the present invention.
Figure 41B:
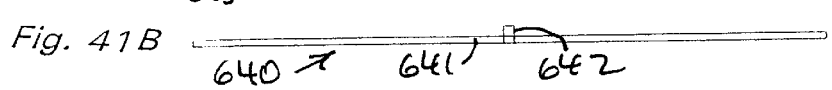
FIG. 41B is a side view of the wear strip of FIG. 41A.

FIGS. 41A and 41B show a wear strip 640 according to the present invention which has a body 641 and an upstanding member 642 for receipt within a corresponding hole of a screen assembly. Using holes 643 at either end of the body 641, the wear strip 640 is connectible to an end or side or crossmember of a shale shaker's screen assembly mounting structure. Each opening 643 has, optionally, a bevelled edge portion 644 for ease of installation. A connector on a shaker tray can be inserted through a generally round part 645 of the openings 643 and then the wear strip is moved (to the left in FIG. 41A) to secure the wear strip in place with the connectors.

FIG. 42 shows a tray 650 according to the present invention for a screen assembly mounting structure of a shale shaker like the tray 400, FIG. 19, and like numerals indicate the same parts. The tray 650 has three holes 652 in each of its ends 402, 404. (Note that fluid flow over a screen assembly on the tray 650, and on any similar tray, may be from the top side 406 in FIG. 42 to the bottom side 406 in FIG. 42; or alternatively from end 402 to end 404). The holes 652 may be located, sized and configured for receipt therein of corresponding downwardly projecting members of a screen assembly or they may be used for releasably connecting a wear strip according to the present invention to the tray 65 (or they may be used for receiving fasteners that pass through a screen assembly, as may be any hole in any tray according to the present invention).

FIG. 43 shows a tray 660 according to the present invention like the tray 400 of FIG. 19 and like numerals indicate the same parts. Each end 402, 404 has on its top surface an amount 662 of releasably cooperating hook-and-loop connection material and each of two wear strips 664 has a corresponding amount 665 (see e.g. FIG. 44) of such releasably cooperating hook-and-loop connection material (e.g. but not limited to VELCROT™ material) for releasably connecting the wear strips 664 to the tops of the ends of tray 660. Each wear strip has an upstanding member 667 (like the upstanding member 420, FIG. 19). The wear strips 664 are shown above the tray 400 over the positions on the tray 664 at which they are connected in use (as is true for the wear strips shown above the tray in FIG. 45).

Figure 45:
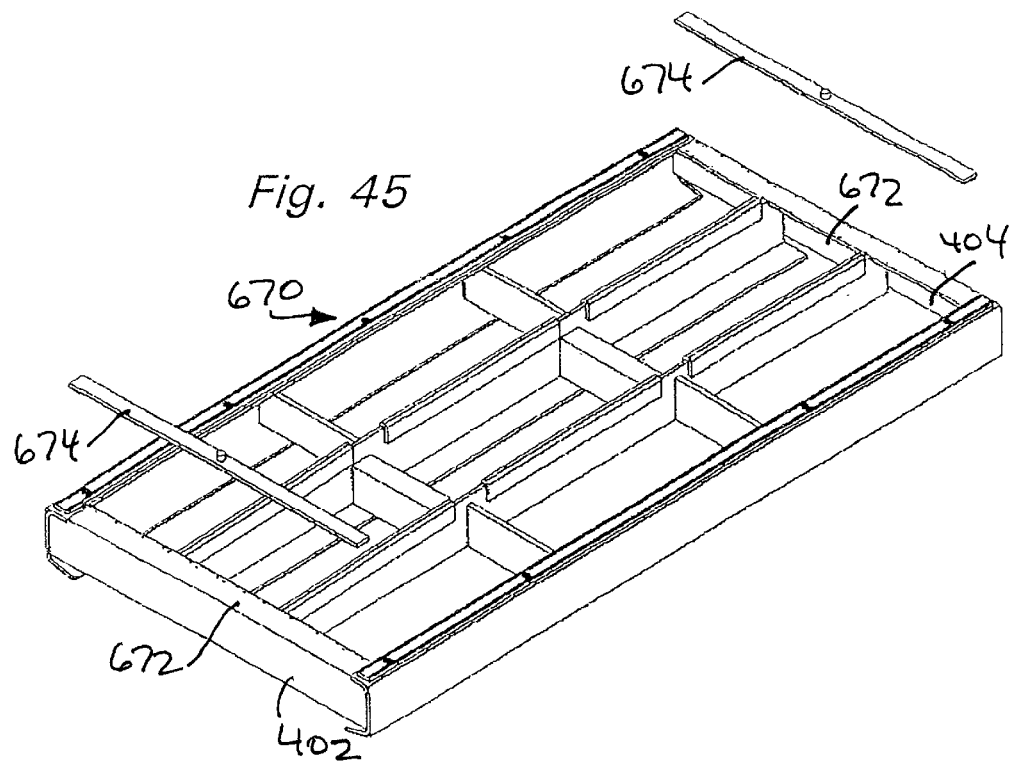
FIG. 45 is a perspective view of a screen assembly mounting structure for a shale shaker according to the present invention.

FIG. 45 shows a tray 670 according to the present invention like the tray 400 of FIG. 19 and like numerals indicate the same parts. Each end 402, 404 has on its top surface an amount 672 of two-sided adhesive tape for adhesively and releasably securing each of two wear strips 674 to the tops of the ends of tray 670. Each wear strip 674 has an upstanding member 677 (like the upstanding member 420, FIG. 19).

Figure 46:
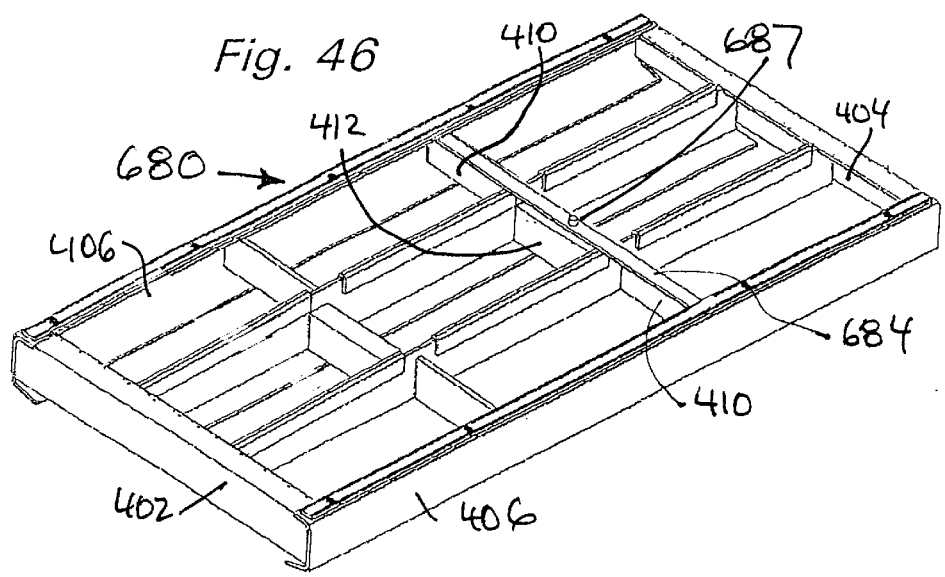
FIG. 46 is a perspective view of a screen assembly mounting structure for a shale shaker according to the present invention.

FIG. 46 shows a tray 680 according to the present invention like the tray 400, FIG. 19, and like numerals indicate the same parts. A wear strip 684 is secured on crossmembers 410, 412 as shown with any suitable securement, fastener, adhesive, and/or welding. It is within the scope of this invention to have a wear strip according to the present invention on any crossmember or crossmembers of a shale shaker's screen assembly mounting structure.

Figure 47:
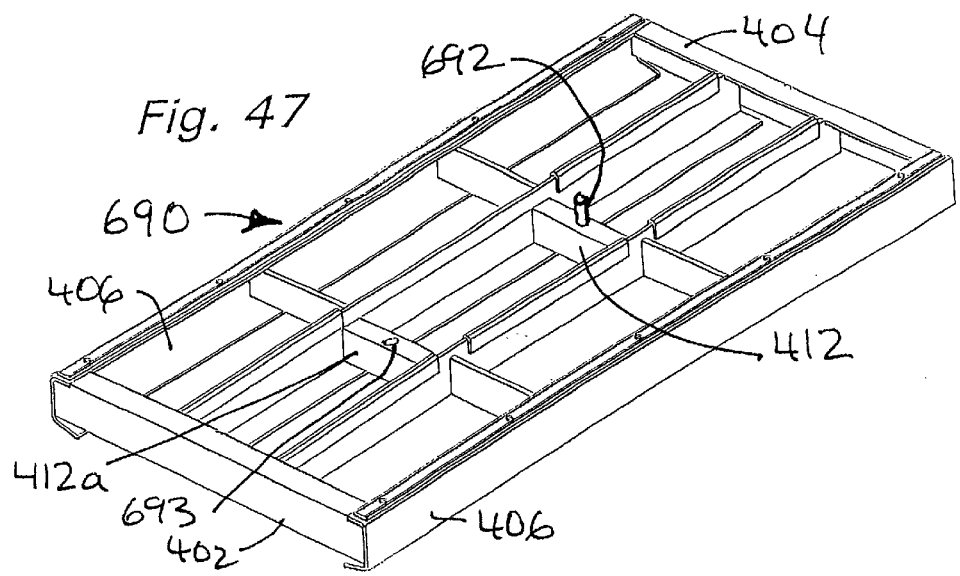
FIG. 47 is a perspective view of a screen assembly mounting structure for a shale shaker according to the present invention.

FIG. 47 shows a tray 690 according to the present invention like the tray 400, FIG. 19, and like numerals indicate the same parts. A crossmember 412 has an upstanding member 692 for receipt within a corresponding hole of a screen assembly emplaced on the tray 690. Another crossmember 412*a* has a hole 693 for receiving a downwardly projecting member of a screen assembly emplaced on the tray 690. Any number of holes 693 on any of the crossmembers may be used according to the present invention; and/or any number of upstanding members 692 may be used on any of the crossmembers. The hole 693 and upstanding member 692 may have any shape for holes and upstanding members, respectively, disclosed herein.

Figure 48:
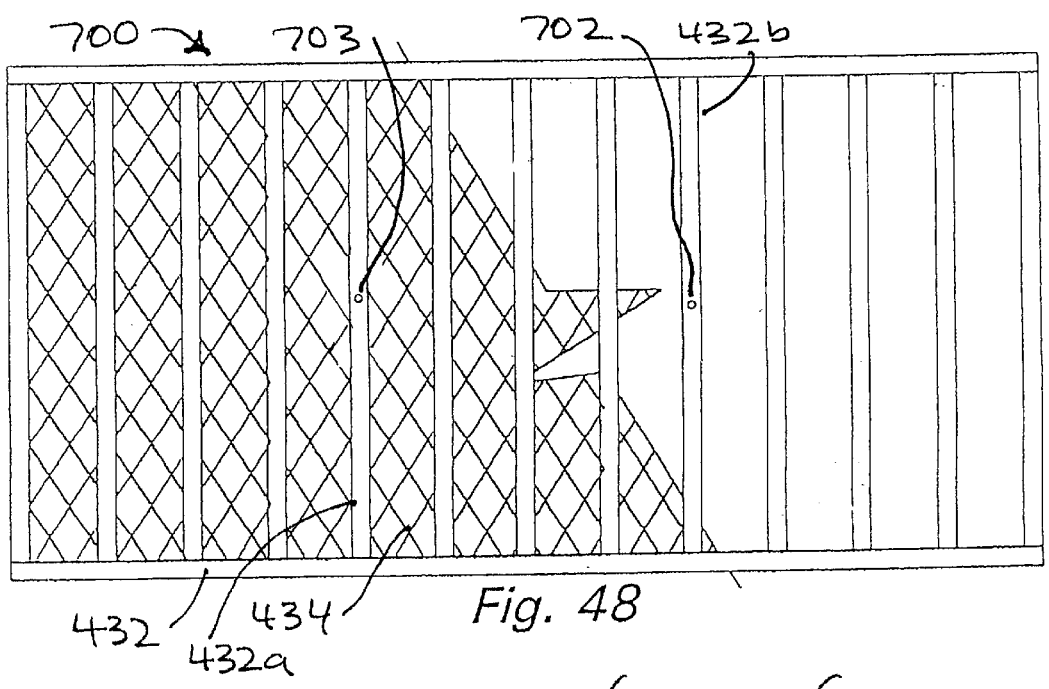
FIG. 48 is a bottom view of a screen assembly according to the present invention.

FIG. 48 shows a screen assembly 700 like the screen assembly 430, FIG. 20A, and like numerals indicate the same parts. One crossmember 432*a* of the frame 432 has a hole 703 sized, located and configured for receiving a corresponding upstanding member of a screen mounting structure of a shale shaker. A crossmember 432*b* of the frame 432 has a projecting member 702 for receipt within a corresponding hole in a screen mounting structure of a shale shaker. Any number of holes 703 may, according to the present invention, be used on a crossmember or crossmembers of the frame 432; and/or any number of projecting members 702 may, according to the present invention, be used on a crossmember or crossmembers of the frame 432.

Figure 49A:
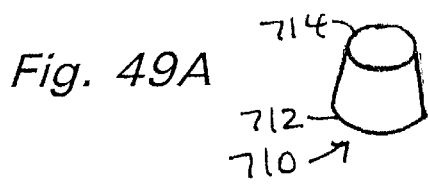
FIG. 49A is a perspective view of the upstanding member for embodiments of the present invention.

FIG. 49A shows a projecting member 710 according to the present invention which may be used for any upstanding or upwardly projecting member or downwardly projecting member disclosed herein. The projecting member 710 has a base 712 larger than a top 714.

Figure 49B:
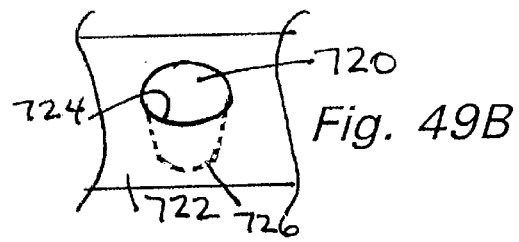
FIG. 49B is a perspective view of the hole for embodiments of the present invention.

FIG. 49B shows a hole 720 in material 722 which has a top opening 724 larger than a hole bottom 726. Such a hole may be used for any hole in any embodiment of the present invention. The base 712 and top 714 (and the top opening 724 and hole bottom 726) may be any desired size, and the distance between them may be any desired length; and the shape of the top 714 and base 712 (and of the top openings 724 and hole bottom 726) may be any shape disclosed herein for an upstanding or upwardly projecting member.

FIGS. 50A and 50B show a screen assembly 730 according to the present invention which has a plurality of glued-together layers of screening material 731, 732, 733 with a plate 734 attached at one end and secured to the lower layer 733 of screening material. Holes 735 extend through the screening material layers and through the plate 734. The plate 734 may be adhesively secured to the screening material and/or any suitable fastener and/or clamp apparatus may be used for such securement. The holes 735 may be used (as may the holes 743, FIG. 50C) as holes for receiving an upstanding member of a screen assembly mounting structure of a shale shaker; or fasteners may be inserted through the holes to releasably secure the screen assembly to a shale shaker screen assembly mounting structure. As with the glued-together layers of the screen assemblies of FIGS. 50C, 50E and 50G the screen assembly 730 may be any combination of two, three or more layers of screening material and/or mesh as disclosed in pending U.S. applications Ser. No. 10/037,474 filed Oct. 19, 2001, and Ser. No. 10/087,025 filed Oct. 19, 2001 entitled "Glued Screens For Shale Shakers" naming Thomas C. Adams, Kerry Ward, Kenneth W. Seyffert, David W. Largent, David L. Schulte, Jr., Charles N. Grichar, Vincent D. Leone, Jeffrey E. Walker, and Guy L. McClung, III as co-inventors, said applications incorporated fully herein in their entirety for all purposes.

Optionally, the screen assembly 730 has holes 736 through the screening material and through plates 737*a*, 737*b*; and, optionally, holes 738 through a plate 739. It is within the scope of the present invention to provide a hole or holes on the outer periphery of the screen assembly 730 or to provide one or more holes with a corresponding lower plate (made of any suitable material including materials disclosed herein for wear strips and projecting members, rigid or flexible) at an inner area of the screen assembly 730 (and as may be provided in the screen assemblies of FIGS. 50C and 50E).

FIGS. 50C and 50D show a screen assembly 740 according to the present invention which has a plurality of glued-together layers of screening material 742 (like the layers 731–733, FIG. 50B) and holes 743 through a plate 741 (like the plate 734, FIG. 50B). Optionally, a flexible seal flap 744 is provided along an end (or side) of the screen assembly and it is within the scope of the present invention to provide such a flexible seal flap on the opposite side or end (or on any side or end of any known screen assembly) for sealing a screen-assembly-basket-wall interface when the screen assembly is in position in a shale shaker basket. A hook apparatus 745 is connected to one end (or side) of the screen assembly 740 and provides a hook structure that can be engaged by known screen mounting apparatuses. With pins or fasteners extending through the holes 743 to releasably connect the screen assembly 740 at one side of a screen basket, tension can be applied to the screen assembly 740 through the hook apparatus 745 for efficient tensioning and positioning of the screen assembly on a shale shaker.

FIGS. 50E and 50F show a screen assembly 750 according to the present invention which has a plurality of glued-together layers of screening material 752 with plates 753, 754 on either side of the screen assembly 750. Downwardly projecting members 755 (which may be like any downwardly projecting members disclosed herein) project down from the plates 753, 754 and are sized, located, and configured for receipt in corresponding holes of a screen assembly mounting structure of a shale shaker.

FIG. 50G shows a screen assembly 760 according to the present invention which has a plurality of glued-together layers of screening material 762 (like the layers 731–732, 742, and 752 disclosed above). An outer peripheral layer 763 of glue, adhesive, and/or epoxy surrounds the screen assembly 760 and a plurality of spaced-apart holes 765 extend through the layer 763 and through the layers of screening material. (Alternatively the layers 763 and/or 764 may be made of material like that of any plate in FIGS. 50A–50F.) Optionally a layer 764 like the layer 763 is provided on the bottom of the screen assembly 760. Any one, two, or three sides of either layer 763, 764 may be deleted, e.g. if holes are desired on less than all sides of the screen assembly. A plate or plates (rigid or flexible) may be positioned above layers of screening material above any plate in FIGS. 50A–50F.

FIG. 51 shows a wear strip 770 (which may be any wear strip according to the present invention) which is made in a bowed shape as shown in FIG. 51 so that it will exert an upward force on a screen assembly mounted above it in a shale shaker. Alternatively, any wear strip according to the present invention which is flexible may be connected to a shale shaker screen assembly mounting structure so that it is bowed upwardly. It is within the scope of the present invention to employ an initially-bowed wear strip in a flattened position so that in such flattened position it exerts an upward force on a screen assembly above it. This can be useful when wedges or other screen holding items are used which are made of a material such as rubber or urethane which can shrink or loose some of its resiliency in use thereby loosening the mounting of a screen assembly in a shale shaker.

The present invention, therefore, in some and not necessarily all embodiments, provides mounting structure for a shale shaker to which is releasably mountable a screen assembly, the mounting structure having a body over which a screen assembly is positionable, part of material to be treated by the shale shaker flowable through the body, at least one upwardly projecting member projecting upwardly from the body, the at least one upwardly projecting member sized and configured so it is receivable in a corresponding hole in the screen assembly.

The present invention, therefore, in some and not necessarily all embodiments, provides mounting structure for a shale shaker to which is releasably mountable a screen assembly, the mounting structure having a body over which a screen assembly is positionable, part of fluid to be treated by the shale shaker flowable through the body, at least one hole in the body projecting down into the body, the at least one hole sized and configured for receiving a corresponding downwardly projecting member of the screen assembly.

The present invention, therefore, in some and not necessarily all embodiments, provides a wear strip (any screen assembly mounting structure may have one, two, three, four or more of them—e.g., on two opposite ends, on two opposite sides, and/or on one or more crossmembers) for attachment to a mounting structure of a shale shaker to which is releasably mountable a screen assembly, the wear strip having a body, at least one upwardly projecting member projecting upwardly from the body member, the at least one upwardly projecting member sized, located and configured so it is receivable in a corresponding hole in the screen assembly.

The present invention, therefore, in some and not necessarily all embodiments, provides a screen assembly for releasable mounting to a mounting structure of a shale shaker, the screen assembly having one or more screen holes as described herein and/or one or more projecting members as described herein for mating with corresponding hole(s) and/or projecting member(s) of a screen mounting structure and/or a wear strip or wear strips thereof of a shale shaker.

The present invention, therefore, in some and not necessarily all embodiments, provides a shale shaker with: one, two, three or more screen assembly mounting structures as described herein; one, two, three, four or more wear strips as described herein; and/or one, two, three or more screen assemblies as described herein; and methods for their use.

The present invention, therefore, in some and not necessarily all embodiments, provides a screen assembly with a hole or holes in a surface of a support of a screen assembly, e.g., but not limited to in part of a tubular frame of a screen assembly, and a projecting member or members are moved into such hole or holes (e.g., a projecting member on a screen assembly holding member or structure or on an air bladder that is inflated above or below a screen assembly to secure it in place on a shaker deck, bed or tray). In certain such aspects the screen assemblies shown in the drawings and described herein have the hole or holes in the topmost surface of a screen frame or tubular support or in the bottom thereof.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A screen assembly for releasable mounting to a mounting structure of a shale shaker, the mounting structure comprising a body over which a screen assembly is positionable, part of fluid to be treated by the shale shaker flowable through the body, at least one upwardly projecting member projecting upwardly from the body member, said at least one upwardly projecting member sized and configured so it is receivable in a corresponding hole in the screen assembly, said at least one projecting member having a projecting member cross-sectional area, the screen assembly comprising a support, screening material on the support, the support comprising a frame with two spaced-apart ends, the two spaced-apart ends spaced-apart by two spaced-apart sides, each of the two spaced-apart sides connected to each of the two spaced-apart ends, the frame having a plurality of spaced-apart crossmembers extending between the two spaced-apart sides from one side to the their side, at least one of the plurality of spaced-apart crossmembers comprising a tubular member with a top and a bottom, a portion of the screening material on top of the tubular member, at least one hole in the bottom of the tubular member, said at least one hole sized, configured, and located for receiving said at least one upwardly projecting member of the body of the mounting structure, said at least one hole having a hole area, said hole cross-sectional are a greater than said projecting member cross-sectional area.

2. The screen assembly of claim 1 wherein the at least one upwardly projecting member of the body of the mounting structure is a plurality of spaced-apart upwardly projecting members and wherein the at least one hole is a plurality of spaced-apart holes, each for receiving an upwardly projecting member of the body of the mounting structure.

3. The screen assembly of claim 1 wherein the at least one upwardly projecting member is a plurality of upwardly projecting members and wherein the at least one of the plurality of spaced-apart crossmembers is a plurality of tubular spaced-apart cross members, each with at least one hole in a bottom thereof for receiving one of the plurality of upwardly projecting members.

4. The screen assembly of claim 1 further comprising at least one downwardly projecting member projecting downwardly from the tubular member, said at least one downwardly projecting member sized, configured, and located for receipt within a corresponding hole of said mounting structure.

5. A screen assembly for releasable mounting to a mounting structure of a shale shaker, the mounting structure comprising a body over which a screen assembly is positionable, part of fluid to be treated by the shale shaker flowable through the body, at least one hole in the body, said at least hole sized and configured for receipt therein of a corresponding downwardly projecting member of the screen assembly, said at least one projecting member having a projecting member cross-sectional area, the screen assembly comprising a support, screening material on the support, the support comprising a frame with two spaced-apart ends, the two spaced-apart ends spaced-apart by two spaced-apart sides, each of the two spaced-apart sides connected to each of the two spaced-apart ends, the frame having a plurality of spaced-apart crossmembers extending between the two spaced-apart sides from one side to the other side, at least one of the plurality of spaced-apart crossmembers comprising a tubular member with a top and a bottom, a portion of the screening material on top of the tubular member, at least one downwardly projecting member projecting downwardly from the bottom of the tubular member, said at least one downwardly projecting member sized, configured, and located for receipt within a corresponding hole of said mounting structure, said at least one hole having a hole area, said hole cross-sectional area greater than said projecting member cross-sectional area.

6. The screen assembly of claim 5 wherein the at least one downwardly projecting member is a plurality of spaced-apart downwardly projecting members and wherein the at least one hole in the body of the mounting structure is a plurality of spaced-apart holes, each for receiving a downwardly projecting member.

7. The screen assembly of claim 5 wherein the at least one downwardly projecting member is a plurality of downwardly projecting members and wherein the at least one of the plurality of spaced-apart crossmembers is a plurality of tubular spaced-apart cross members, each of said tubular spaced-apart cross members with at least one hole in a bottom thereof for receiving one of the plurality of downwardly projecting members.

8. A shale shaker system for separating components of drilling fluid with solids entrained therein, the shale shaker system comprising a base, a screen mounting basket on the base, vibrating apparatus connected to the screen mounting basket for vibrating the screen mounting basket, the screen mounting basket comprising mounting structure for at least one screen assembly mounted on the mounting structure, the mounting structure comprising a body over which the a least one screen assembly is positionable, part of the drilling fluid to be treated by the shale shaker flowable through the at least one screen assembly and through the body, at least one screen assembly mounted on the mounting structure, the at least one screen assembly comprising a screen assembly for releasable mounting to the mounting structure of a shale shaker, the mounting structure having at least one upwardly projecting member projecting upwardly from the body member, said at least one upwardly projecting member sized and configured so it is receivable in a corresponding hole in the screen assembly, said at least one projecting member having a projecting member cross-sectional area, the screen assembly including a support, screening material on the support, the support comprising a frame with two spaced-apart ends, the two spaced-apart ends spaced-apart by two spaced-apart sides, each of the two spaced-apart sides connected to each of the two spaced-apart ends, the frame having a plurality of spaced-apart crossmembers extending between the two spaced-apart sides from one side to the other side, at least one of the plurality of spaced-apart crossmembers comprising a tubular member with a top and a bottom, a portion of the screening material on top of the tubular member, and at least one hole in the bottom of the tubular member, said at least one hole sized, configured, and located for receiving said at least one upwardly projecting member of the body of the mounting structure, said at least one hole having a hole cross-sectional area, said hole cross-sectional area greater than said projection member cross-sectional area.

9. The shale shaker of claim 8, wherein the at least one upwardly projecting member is a plurality of upwardly projection members and wherein the at least one of the plurality of spaced-apart crossmembers is a plurality of tubular spaced-apart cross members, each of said tubular spaced-apart cross members with at least one hole in a bottom thereof for receiving one of the plurality of upwardly projecting members.

10. The screen assembly of claim 5 wherein the at least one upwardly projecting member is a plurality of upwardly projection members and wherein the at least one of the plurality of spaced-apart crossmembers is a plurality of tubular spaced-apart cross members, each with at least one hole in a bottom thereof for receiving one of the plurality of upwardly projecting members.

11. A shale shaker system for separating components of drilling fluid with solids entrained therein, the shale shaker system comprising a base, a screen mounting basket on the base, vibrating apparatus connected to the screen mounting basket for vibrating the screen mounting basket, the screen mounting basket comprising mounting structure for at least one screen assembly mounted on the mounting structure, the mounting structure comprising a body over which the at least one screen assembly is positionable, part of the drilling fluid to be treated by the shale shaker flowable through the at least one screen assembly and through the body, at least one screen assembly mounted on the mounting structure, the at least one screen assembly comprising a screen assembly for releasable mounting to a mounting structure of a shale shaker, the mounting structure having at least one hole in the body, said at least hole sized and configured for receipt therein of a corresponding downwardly projecting member of the screen assembly, the screen assembly including a support, screening material on the support, the support comprising a frame with two spaced-apart ends, the two spaced-apart ends spaced-apart by two spaced-apart sides, each of the two spaced-apart sides connected to each of the two spaced-apart ends, the frame having a plurality of spaced-apart crossmembers extending between the two spaced-apart ides from one side to the other side, at least one of the plurality of spaced-apart crossmembers comprising a tubular member with a top and a bottom, a portion of the screening material on top of the tubular ember, and at least one downwardly projecting member projecting downwardly from the bottom of the tubular member, said at least one projecting member having a projecting member cross-sectional area, said at least one downwardly projecting member sized, configured, and located for receipt within a corresponding hole of said mounting structure, said at least one hole having a hole area, said hole cross-sectional area greater than said projecting member cross-sectional area.

12. The screen assembly of claim 4 wherein the at least one downwardly projecting member is a plurality of spaced-apart downwardly projecting members and wherein the at least one hole in the body of the mounting structure is a plurality of spaced-apart holes, each for receiving a downwardly projecting member.

13. The screen assembly of claim 11, wherein the at least one downwardly projecting member is a plurality of downwardly projecting members and wherein the at least one of the plurality of spaced-apart crossmembers is a plurality of tubular spaced-apart cross members, each of said tubular spaced-apart cross members with at least one hole in a bottom thereof for receiving one of the plurality of upwardly projecting members.

14. A screen assembly for releasable mounting to a mounting structure of a shale shaker, the mounting structure comprising a body over which a screen assembly is positionable, part of fluid to be treated by the shale shaker flowable through the body, at least one upwardly projecting member projecting upwardly from the body member, said at least one upwardly projecting member sized and configured so it is receivable in a corresponding hole in the screen assembly, said at least one projecting member having a projecting member cross-sectional area, the screen assembly comprising a support, screening material on the support, the support comprising a frame with two spaced-apart ends, the two spaced-apart ends spaced-apart by two spaced-apart sides, each of the two spaced-apart sides connected to each of the two spaced-apart ends, the frame having a plurality of spaced-apart crossmembers extending between the two spaced-apart sides from one side to the other side, at least part of the frame comprising a tubular member with a top and a bottom, a portion of the screening material on top of the tubular member, at least one hole in the bottom of the tubular member, said at least one hole sized, configured, and located for receiving said at least one upwardly projecting member of the body of the mounting structure, said at least one hole having a hole area, said hole cross-sectional area greater than said projecting member cross-sectional area.

15. A shale shaker system for separating components of drilling fluid with solids entrained therein, the shale shaker system comprising a base, a screen mounting basket on the base, vibrating apparatus connected to the screen mounting basket for vibrating the screen mounting basket, the screen mounting basket comprising mounting structure for at least one screen assembly mounted on the mounting structure, the mounting structure comprising a body over which the least one screen assembly is positionable, part of the drilling fluid to be treated by the shale shaker flowable through the at least one screen assembly and through the body, at least one screen assembly mounted on the mounting structure, the at least one screen assembly comprising a screen assembly for releasable mounting to the mounting structure of a shale shaker, the mounting structure having at least one upwardly projecting member projecting upwardly from the body member, said at least one upwardly projecting member sized and configured so it is receivable in a corresponding hole in the screen assembly, said at least one projecting member having a projecting member cross-sectional area, the screen assembly including
a support,
screening material on the support,
the support comprising a frame with two spaced-apart ends, the two spaced-apart ends spaced-apart by two spaced-apart sides, each of the two spaced-apart sides connected to each of the two spaced-apart ends, the frame having a plurality of spaced-apart cross-members extending between the two spaced-apart sides from one side to the other side, at least part of the frame comprising a tubular member with a top and a bottom, a portion of the screening material on top of the tubular member, and
at least one hole in the bottom of the tubular member, said at least one hole sized, configured, and located for receiving said at least one upwardly projecting member of the body of the mounting structure, said at least one hole having a hole cross sectional area, said hole cross-sectional area greater than said projecting member cross-sectional area.

* * * * *